United States Patent [19]
Koyama et al.

[11] Patent Number: 5,555,179
[45] Date of Patent: Sep. 10, 1996

[54] CONTROL METHOD AND CONTROL APPARATUS OF FACTORY AUTOMATION SYSTEM

[75] Inventors: Masahiro Koyama, Ibaraki-ken; Norihisa Miyake, Matsudo; Hiroshi Sakairi, Tsukuba; Shizuko Hattori; Yasuyuki Momoi, both of Ibaraki-ken; Tsutomu Fujimoto; Tsuyoshi Kai, both of Tochigi-ken, all of Japan

[73] Assignee: Hitachi, Ltd., Tokyo, Japan

[21] Appl. No.: 299,632

[22] Filed: Sep. 2, 1994

[30] Foreign Application Priority Data

Sep. 3, 1993 [JP] Japan .................................. 5-219511

[51] Int. Cl.⁶ .............................................. G05B 19/418
[52] U.S. Cl. ...................... 364/468.01; 364/191
[58] Field of Search .................................. 364/140–145, 364/191–194, 468

[56] References Cited

U.S. PATENT DOCUMENTS

| | | | |
|---|---|---|---|
| 4,730,258 | 3/1988 | Takeda et al. | 364/191 |
| 4,852,047 | 7/1989 | Lavallee et al. | 364/191 |
| 5,257,363 | 10/1993 | Shapiro et al. | 364/191 |

FOREIGN PATENT DOCUMENTS

| | | |
|---|---|---|
| 44 31 315 | 3/1996 | Germany . |
| 61-110204 | 5/1985 | Japan . |

OTHER PUBLICATIONS

"Petri Net Based Programming System for FMS" in IEICE Trans. Fundamentals vol. E75–A, No. 10, 1992, pp. 1326 to 1334.

"Entwurf verklemmungsfreier Steuerungen auf Grundlage einer graphentheoretischen Petri–Netz–Analyse" in auto–matisierungstechnische Praxis at 3/1993, pp. 88–93.

Primary Examiner—Roy N. Envall, Jr.
Assistant Examiner—Steven R. Garland
Attorney, Agent, or Firm—Antonelli, Terry, Stout & Kraus

[57] ABSTRACT

A computer-implemented control method and a control apparatus of factory automation system having a cell formed by a plurality of working machines including at least one automated machine to execute a series of works in accordance with a control program. From a cell control program including specifications of working of entire cell that is input to the computer, information relating to working sequence of a plurality of working machines and information about control of inputs and outputs of a plurality of working machines are described, the specifications and informations are extracted by the computer. On the basis of the extracted information, a sequence control program by which control of the working sequence of a plurality of working machines and control of inputs and outputs of a plurality of working machines is generated by the computer are described. From the cell control program, information about operation control of the automated machine and information about synchronization of operation of the working machines are extracted by the computer. On the basis of the extracted information, an automated machine control program, by which processing for exercising control over positioning and operation trajectory of the automated machine are described, is generated by the computer. And working of the cell is controlled in accordance with the sequence control program and the automated machine control program.

21 Claims, 24 Drawing Sheets

FIG.6
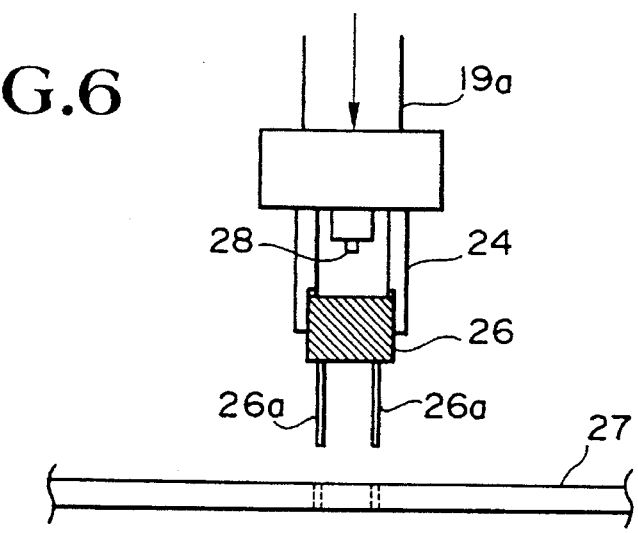
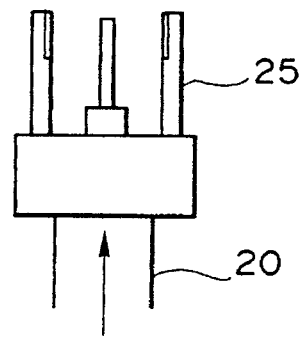
FIG.7
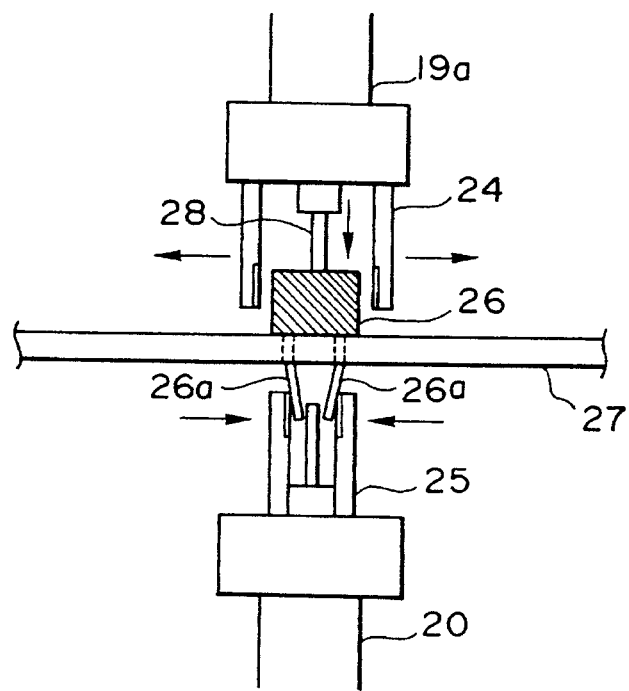

FIG.12

"M-net"
"cell"

[M001] M000 : OK1
  START S010
  START S020
  SET Y001
[M002] M001 : OK1 | M002 : OK1
  START S050
  START S150
  SET Y002
  RST Y000
[M003] M002 : OK1
  START S010
  START S020
  SET Y000
  RST Y002

"def"

[M001]
  OK1 : X001 = ON
  OK2 : X003 = ON
  NG1 : Any Error Occurring
[M002]
  OK1 : X002 = ON
  NG1 : Any Error Occurring
[M002]
  OK1 : Complete Normal
  NG1 : Any Error Occurring

FIG.15

```
# MODE 2
# ARM 1

IF ( S100 = Complete Normally )
-)
  SET Y100
  SET TD100 001.0
  EXEC S101

IF ( S101 = Executing )
& ( X100 = ON )
& ( TD100 = OFF )
-)
  SET Y101
  SET TD101 001.0
  EXEC S102

IF ( S102 = Executing )
& ( X101 = ON )
& ( TD101 = OFF )
-)
  EXEC S103
  EXEC REQ1

IF ( S103 = Complete Normally )
& ( REQ2 = Complete Normally )
-)
  RST Y101
  SET TD102 001.0
  EXEC S104

IF ( S104 = Executing )
& ( X101 = OFF )
& ( TD102 = OFF )
-)
  EXEC S105
          ↓
          ※
```

```
          ※
          ↓
# ARM 2

IF ( S200 = Complete Normally )
-)
  EXEC S201           48

┌─────────────────────────────┐
  │ IF ( S201 = Complete Normally )
  │ & ( REQ1 = Complete Normally )
  │ -)
  │   SET Y200
  │   SET TD200 001.0
  │   EXEC S202
  └─────────────────────────────┘

IF ( S202 = Executing )
& ( X200 = ON )
& ( TD200 = OFF )
-)
  RST Y200
  SET TD201 001.0
  EXEC S203
  EXEC REQ2

IF ( S203 = Executing )
& ( X200 = OFF )
& ( TD201 = OFF )
-)
  EXEC S204

IF ( S204 = Complete Normally )
-)
  EXEC S205
```

FIG.16

```
# MODE 2
# ARM 1                          # ARM 2

STT 100                          STT 200
MOV P1 (1)                       MOV P2 (1)
STT 101                          STT 201
NOP                              MOVZ +10.0    ⌒49
STT 102                          STT 202
NOP                              NOP
STT 103                          STT 203
NOP                              NOP
STT 104                          STT 204
NOP                              MOVZ -10.0
STT 105                          STT 205
MOV P1 (2)                       MOV P2 (2)
```

FIG.18

```
MODE 002
ARM 001                  ARM 002
STT 100                  STT 200
MOV P 001 001            MOV P 002 001
STT 101                  STT 201
NOP                      MOVZ UP 010.0      ⎯ 49
STT 102                  STT 202
NOP                      NOP
STT 103                  STT 203
NOP                      NOP
STT 104                  STT 204
NOP                      MOVZ DW 010.0
STT 105                  STT 205
MOV P 001 002            MOV P 002 002
```

FIG.26

ARM 1

```
WAIT ON I 0
MOV P 1 ( 1 )
OUT ON 01 000.5
WAIT ON I 1
MOV P 1 ( 2 )
```

FIG.27

ARM 2

```
WAIT ON I 0
MOV P 2 ( 1 )
 MOVZ +10.0
OUT ON 01 000.5
WAIT ON I 1
MOVZ -10.0
MOV P 2 ( 2 )
```

CONTROL METHOD AND CONTROL APPARATUS OF FACTORY AUTOMATION SYSTEM

BACKGROUND OF THE INVENTION

The present invention relates to a control method and a control apparatus in a factory automation system (hereafter abbreviated to FA system) including cells formed by a plurality of working machines including at least one automated machine such as a robot.

As for the range indicated by the term "robot" herein, it refers to an automated machine automatically controlled in accordance with a previously taught program to conduct a complicated operation or work. Typically, the "robot" has a multi-axis mechanism. Industrial robots and numerical control machine tools are also comprehended in robots. Furthermore, the "cell" refers to a unit block of a working system for conducting a series of works, and the unit block includes an automated machine such as a robot and peripheral machines (or peripheral devices). Factory automation is typically formed by a combination of a plurality of cells individually having a specific work assigned thereto. A peripheral machine refers to a working machine or device including a conveyor, a parts feeding machine, an end effecter (including a mechanical hand) and so on. The peripheral machine operates in conjunction with an automated machine such as a robot in one cell. The peripheral machine (or device) is simpler in function and generally operated under sequence control.

In a conventional control method of an FA system, a sequencer (programmable controller) for controlling inputs and outputs (hereafter abbreviated to I/O) of various peripheral machines or devices and a robot controller for controlling robots are connected via a parallel I/O. Mainly, the sequencer always monitors signals carried over the I/O of various peripheral machines and the parallel I/O of the robot controller, synchronization of operations of various peripheral machines with operation of robots and exercises sequence control of the entire FA system.

As a known example relating to such a control method of the FA system, a control method of FA system described in JP-A-61-110204 can be mentioned. In this known example, there is described a method for describing programs of the robot controller, a visual device, and the sequencer by using a language having a common unified system.

Typically in the above described conventional technique, robot controllers for controlling respective robots are prepared to control a plurality of robots included in the FA system, and each robot controller is taught a program for making a robot controlled by the robot controller perform one or more works. In this case, each robot must be generally taught a different program. In addition, when robots of different kinds are used, robots must be taught robot programs using robot languages of different systems in many cases.

As for a programming language of the sequencer for performing sequence control over peripheral machines (or devices) other than robots and the entire FA system, a latter diagram is the most popular language at present. However, this is a programming language having a form that is completely different from that of robot languages. Under these circumstances, the person in charge of constructing an FA system must learn several different programming languages. In addition, for controlling one FA system, a plurality of programs must be generated by using these different programming languages. This is one of major factors impeding the improvement in the development efficiency of the control program of the FA system.

As for the control method of FA system described in the aforementioned JP-A-61-110204 (corresponding to U.S. Pat. No. 4,730,258 issued on Mar. 8, 1988), a method of describing programs respectively for the robot controller, visual device, and sequencer by using a common language having one system is described. Thereby, it becomes unnecessary for the user to learn different programming languages. However, the program itself must be divided into and described as individual programs, each for individual processing such as robot control or sequence control so as to conform to the function of the device actually processing the individual program. (In the above described example of the known technique, such a unit program is referred to as task.) The user must produce a plurality of programs (tasks). In the same way as the foregoing, this results in a problem that the development efficiency of the control program of the FA system cannot be improved.

An object of the present invention is to provide a control method, and apparatus, whereby when a unit element (hereafter referred to as cell) including one set of a plurality of working machines is to be constructed to form an FA system, programs for controlling some works including synchronization of operations of the working machines included in the cell are unified as a cell control program, the user can describe directly the work specifications of the cell as a whole without being conscious of the configuration of the control device and without the necessity of producing separate programs by using different programming languages for respective control devices and learning several programming languages, and hence reduction of development manhour and improvement of development efficiency can be achieved.

SUMMARY OF THE INVENTION

The present invention provides a control method and a control apparatus of a factory automation system using a computer having a cell formed by a plurality of working machines including an automated machine to execute a series of works in accordance with a control program.

In accordance with the present invention, the following control is performed. From a cell control program, in which specifications of the work of the cell as a whole is described, input to the computer, information relating to working sequence of a plurality of working machines and information about control of inputs and outputs of a plurality of working machines are extracted by the computer. The cell control program has information about a working sequence of a plurality of working machines, information about control of inputs and outputs of a plurality of working machines, information about operation control of the automated machine, and information about synchronization of operations of the working machines. On the basis of the extracted information, a sequence control program, in which control of the working sequence of a plurality of working machines and control of inputs and outputs of a plurality of working machines are described, is generated by the computer. From the cell control program, information about operation control of the automated machine and information about synchronization of operations among the working machines are extracted by the computer. On the basis of the extracted information, an automated machine control program, in which processing for exercising control over positioning and operation trajectory of the automated machine is described, is generated by the computer. And working of the cell is controlled in accordance with the sequence control program and the automated machine control program.

BRIEF DESCRIPTION OF THE DRAWINGS

FIG. 6 is a diagram showing the state before part insertion and lead clinch in the part insertion working cell whereto the present invention is applied;

FIG. 7 is a diagram showing the state after part insertion and lead clinch in the part insertion working cell whereto the present invention is applied;

FIG. 12 shows a result obtained by encoding a part of the Petri net shown in FIG. 11;

FIG. 15 is a diagram showing a surface language program for sequence control generated from the cell control program shown in FIG. 10 according to the present invention;

FIG. 16 is a diagram showing a surface language program for robot control generated from a cell control program shown in FIG. 10 according to the present invention;

FIG. 18 is a diagram showing a robot control internal code program in Mnemonic expression generated from a surface language program for robot control shown in FIG. 16 according to the present invention;

FIG. 26 is a diagram showing an example of a robot control program converted from the cell control program of FIG. 10 so as to correspond to the control apparatus of FIG. 24 according to the present invention; and FIG. 27 is a diagram showing another example of the robot control program converted from the cell control program of FIG. 10 so as to correspond to the control apparatus of FIG. 24 according to the present invention.

DESCRIPTION OF THE PREFERRED EMBODIMENTS

Hereafter, embodiments of the present invention will be described by referring to attached drawings.

Figure 1:
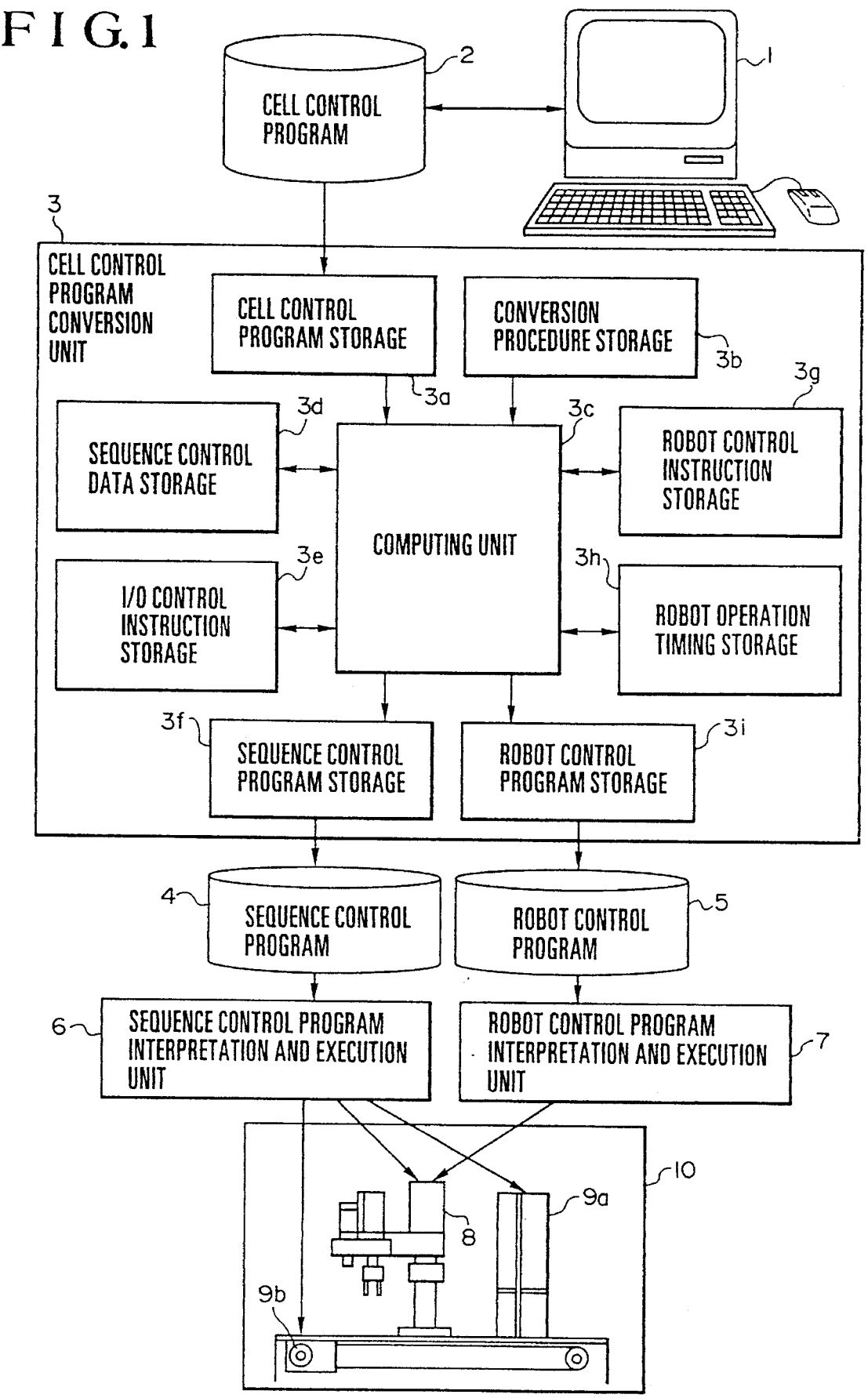
FIG. 1 is a block diagram showing the configuration of an embodiment of a control apparatus for FA system according to the present invention.

FIG. 1 shows an embodiment of a control apparatus for an FA system according to the present invention. In FIG. 1, numeral 10 denotes a cell including a robot 8 and various peripheral machines (or devices) 9a and 9b to form an FA system. Numeral 1 denotes a cell control program editing unit. The cell control program editing unit 1 is used by the operator on the screen of a display device to edit a cell control program 2 in a diagrammatic form using a Petri net. The cell control program 2 controls working of the robot 8 or the peripheral machines 9a and 9b forming the cell 10 and conducts state monitoring on the basis of transition rules of operation mode of the cell 10 as a whole.

Numeral 3 denotes a cell control program conversion unit formed by a microcomputer. This cell control program conversion unit 3 includes a cell control program storage 3a, a conversion procedure storage 3b, a computing unit 3c, a sequence control data storage 3d, an I/O control instruction train storage 3e, a sequence control program storage 3f, a robot control instruction storage 3g, a robot operation timing storage 3h, and a robot control program storage 3i. Each of the storages 3a, 3b, 3d, 3e, 3f, 3g, 3h and 3i is formed by a memory device. The computing unit 3c is a microcomputer CPU.

The computing unit 3c first stores the cell control program 2 in the cell control program storage 3a. Then in accordance with a conversion procedure stored in the conversion procedure storage 3b, the computing unit 3c separates and extracts sequence control data and an I/O control instructions from the cell control program 2 and stores them in the sequence control data storage 3d and the I/O control instruction storage 3e, respectively. On the basis of these types of extracted information, the computing unit 3c monitors I/O states of the robot 8 and the peripheral machines 9a and 9b. Concurrently, the computing unit 3c generates a sequence control program 4 which describes processing for performing control of operation sequence of machines included in the cell 10, i.e., the robot 8 and the peripheral machines 9a and 9b, and for controlling the I/O connected to these machines and processing for managing transition of the operation mode of entire cell 10. At the same time, the computing unit 3c separates and extracts robot control instructions and information of robot operation timing from the cell control program 2 and stores them in the robot control instruction storage 3g and the robot operation timing storage 3h, respectively. On the basis of these types of extracted information, the computing unit 3c generates a robot control program 5 for performing positioning and trajectory control of the robot 8. The sequence control program 4 is interpreted and executed at high speed by a sequence control program interpretation and execution unit 6. In the same way, the robot control program 5 is interpreted and executed by a robot control program interpretation and execution unit 7.

Figure 2:
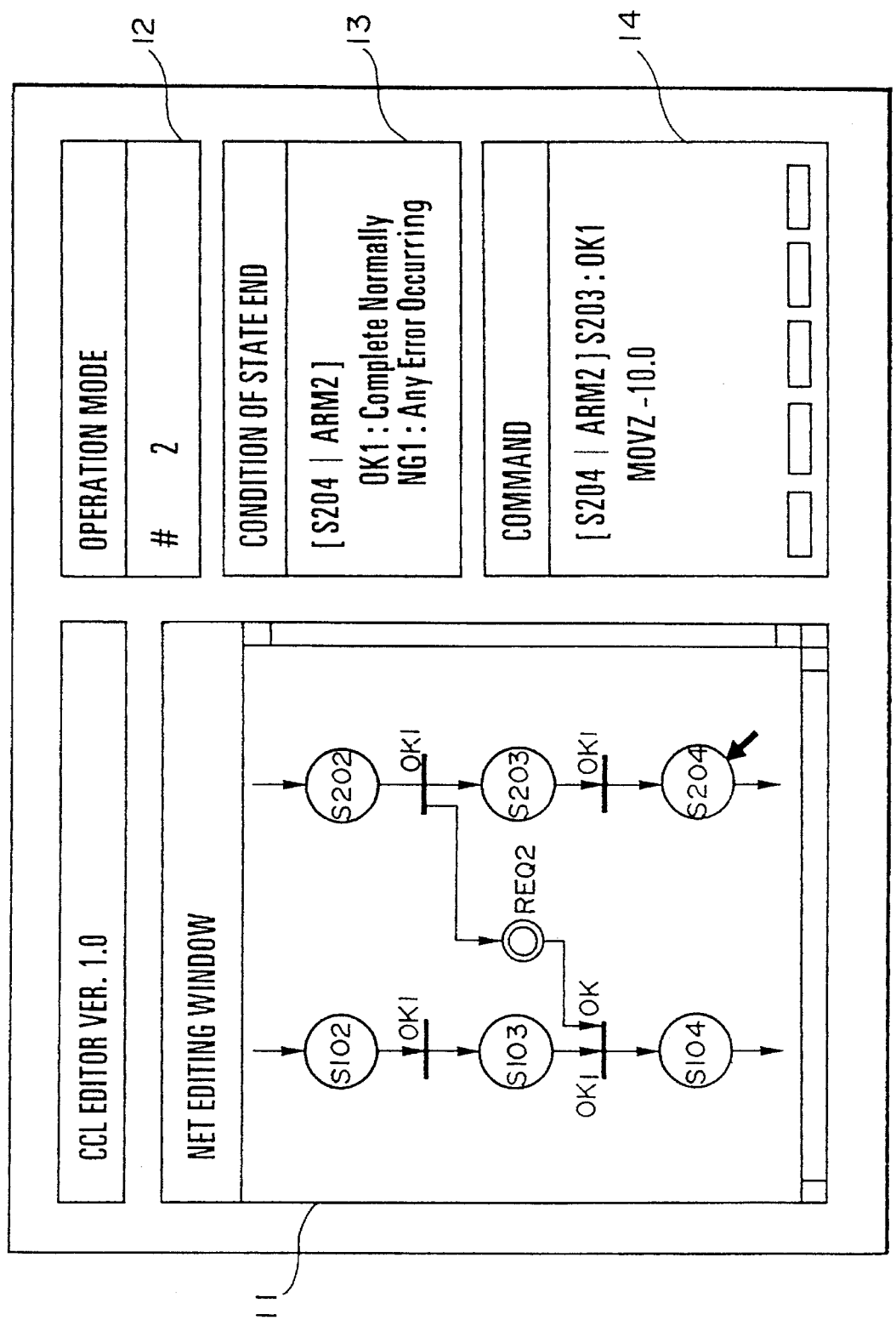
FIG. 2 is a diagram showing an example of the terminal screen display made by a cell control program editing unit included in the apparatus of the present invention.

FIG. 2 shows an example of screen display of a terminal in the cell control program editing unit 1 included in the apparatus of the present invention. The screen display forms a graphical user interface (GUI) having a multiwindow form.

The programming language of the cell control program 2 (hereafter referred to as cell control language) is one kind of graphic language, in which the operation sequence of machines in the cell 10 and the sequence of the operation mode of the entire cell 10 are described using a diagrammatic representation form of a Petri net. In this cell control language, the place of the Petri net is defined as the operation state of a machine or a device included in the cell 10, a transition is defined as a transition condition at the time of transition to the next operation state, and a directed arrow connecting between the place and the transition is defined as a direction of the sequence flow. The place in which a token is placed is defined as the activated state of the present time (hereafter referred to as an activated state). In each place, only one token can exist. Such a safe Petri net is considered as the cell control language.

In a Petri net editing window 11 shown in FIG. 2, the Petri net can be edited using a pointing device such as a mouse in a graphic image on the screen. A operation mode input window 12 is a window for inputting the operation mode of the sequence which is being edited. A state end condition input window 13 is a window for inputting, via a keyboard or the like, condition of normal end (OK condition) and condition of abnormal end (NG condition) as to a state S204 under editing indicated by a mouse cursor in the net editing window 11.

A command input window 14 is a window for inputting a command for defining operation of machines or devices (such as operation instruction of the robot or on/off of I/O) in the state S204 under editing or other processing. The command input window 14 thus provides a simple input environment using a menu selection form with a mouse or function keys.

Figure 3:
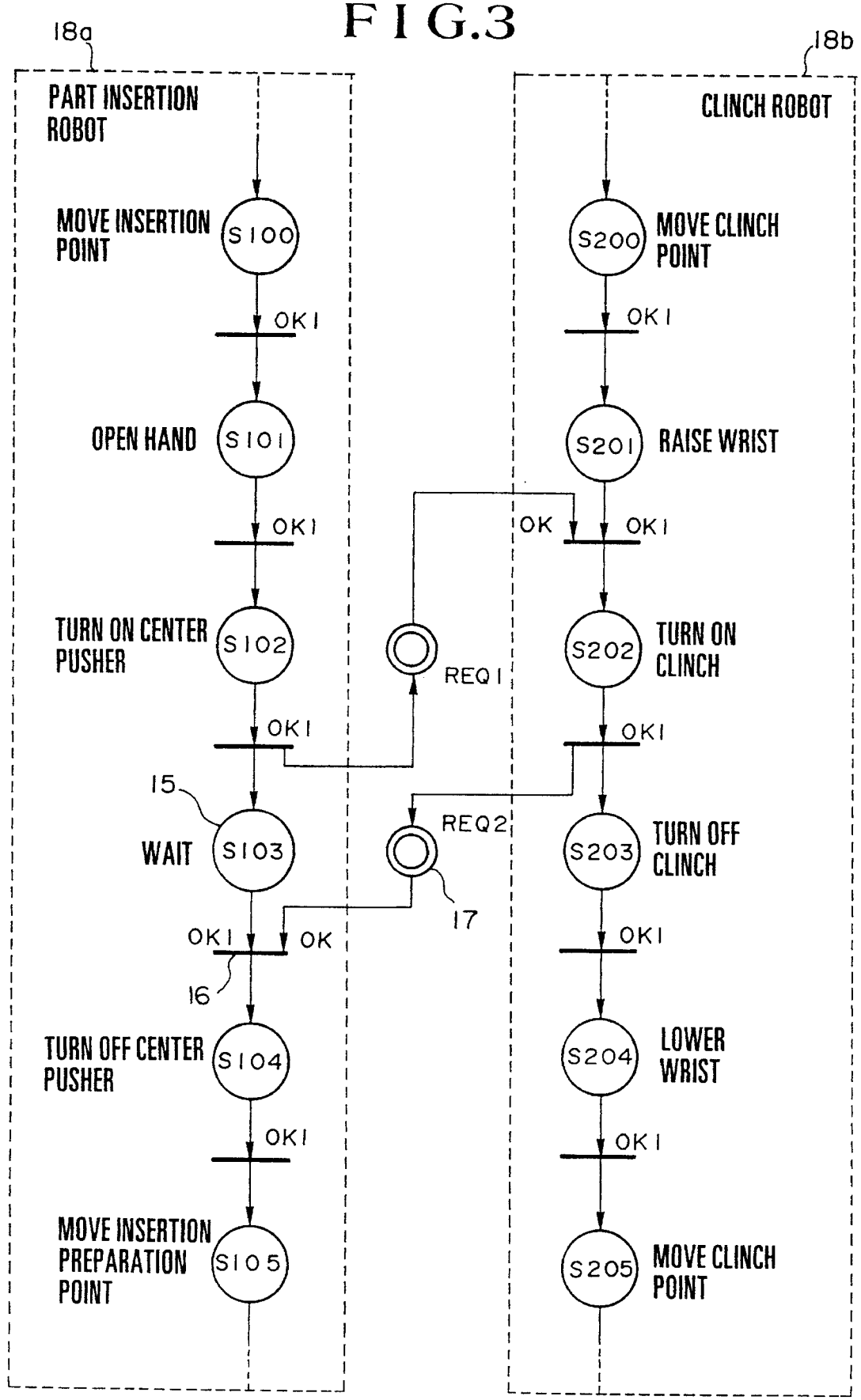
FIG. 3 is a diagram showing an example of a Petri net representing a part of production process of a part insertion working cell whereto the apparatus of the present invention has been applied.

FIG. 3 shows an example of a Petri net produced in the Petri net editing window 11 included in the apparatus of the present invention. The Petri net of FIG. 3 represents a part of the production process of a part insertion working cell shown in FIGS. 4 and 5.

Figure 4:
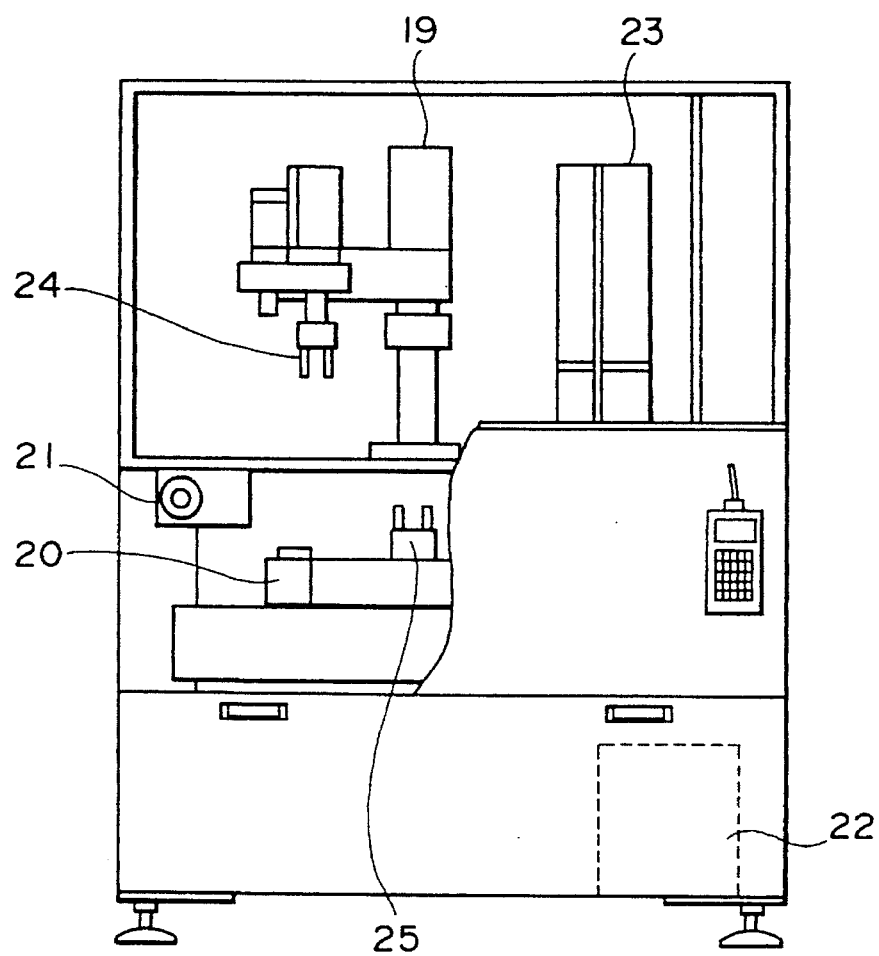
FIG. 4 is a front view of a part insertion working cell whereto the present invention is applied.
Figure 5:
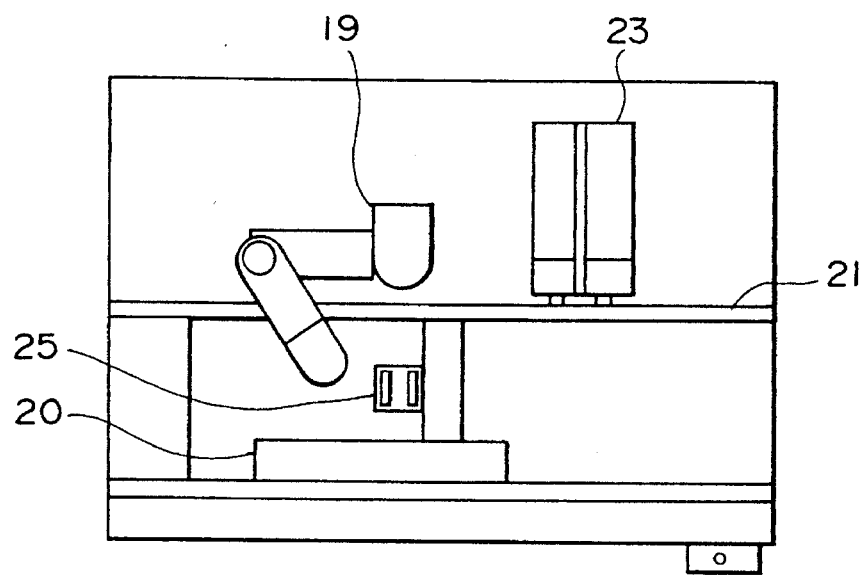
FIG. 5 is a top view of the part insertion working cell whereto the present invention is applied as shown in FIG. 4.

FIGS. 4 and 5 show an example of a part insertion working cell for inserting parts having various shapes into a printed board according to the present invention. FIG. 4 is a side view of the cell. FIG. 5 is a top view of the cell. This part insertion working cell inserts electronic components such as ICs into a printed board. The part insertion working cell positions a printed board fed on a conveyor 21, holds a part with a hand 24 disposed on an end of a part inserting robot 19, and inserts the part into a predetermined position.

Leads of the inserted part are bent by a clinch claw 25 disposed at an end of a clinch robot 20 located under the conveyor, thus preventing the part from falling off.

FIGS. 6 and 7 show how the part insertion operation and lead clinch in FIGS. 4 and 5 are performed. FIGS. 6 and 7 are enlarged views of states of respective devices immediately before insertion and immediately after insertion. The part insertion robot 19 moves a part 26 held by the hand 24 to a predetermined position (insertion point) over a positioned printed board 27, lowers its wrist 19a to a predetermined height, and then releases the part 26 by opening the hand 24. At this time, the clinch robot 20 moves to a predetermined position (clinch point) directly under the printed board, lifts its wrist 20a to a predetermined height, and waits.

When release of the part 26 has been confirmed by a sensor (not illustrated) disposed on the hand 24 of the part insertion robot 19, a center pusher 28 disposed on the wrist 19a of the part insertion robot 19 is lowered to push down the part 26 and insert the part 26 deeply into a predetermined hole of the printed board 27. When it is sensed by a sensor (not illustrated) disposed on the wrist 19a of the part insertion robot 19 that the center pusher 28 has been lowered to a predetermined height, the clinch claw 25 of the clinch robot 20 is closed to bend leads 26a of the part 26. When it is sensed by a sensor (not illustrated) disposed on the clinch claw 25 that clinching has been completed, the clinch claw 25 is opened and the center pusher 28 of the part insertion robot 19 is raised.

Thereafter, the part insertion robot 19 is moved to an insertion preparation point, and the clinch robot 20 is moved to a clinching preparation point.

The aforementioned FIG. 3 describes a part of sequence of insertion and clinching operation shown in FIGS. 4 and 5, i.e., a part of working specifications of the part insertion working cell is described by using a Petri net. In FIG. 3, states S100 to S105 form a module 18a of operation sequence of the part insertion robot 19, whereas states S200 to S205 form a module 18b of operation sequence of the clinch robot 20.

The modules 18a and 18b describe sequences of the operations in respective device groups. Each of the device groups is formed with a combination of machines or devices which are related to each other in the functions and capable of operating in parallel with each other. Hereinafter, such a device group is referred to as a unit. That is to say, the unit performing the operation sequence of the module 18a is the part insertion robot 19 and the unit performing the operation sequence of the module 18b is the clinch robot 20. Two modules 18a and 18b are connected by two synchronizing places 17 REQ1 and REQ2. A place 15 indicates the operation state of the robot or peripheral machines or devices. A transition 16 indicates the condition for transition from a certain state to the next state. Specific contents of the state of the place 15 are defined as commands.

The transition condition of the transition 16 is decided by connection relations of the Petri net and the end condition of each state. OK1 attached to the transition 16 means the normal end of the input state of the transition 16. The condition of this normal end is defined as a state end condition expression. The synchronizing place 17 defines the connection relation of synchronization between the module 18a and the module 18b. To cite one example in FIG. 3, REQ2 is the synchronizing place 17 for achieving synchronization timing between the normal end of the state S103 and the normal end of the state S202. By application of the diagrammatic notation of the Petri net as shown in FIG. 3, the operation sequence of each unit can be described structurally and explicitly.

By thus unifying the control program of the robot and the control program of the peripheral machines or devices as the cell control program 2 and describing the operation sequence of each unit so that the operator may understand it intuitively, the person developing the software of the FA system can easily produce the cell control program 2 so as to directly describe working specifications of the entire cell, without being conscious of any difference in configuration of the control apparatus of machines or devices in the cell and the programming language. That is to say, the developer of the cell control program 2 need not learn several different programming languages, unlike the conventional technique. As a result, the development efficiency of the program is improved and the maintenance of the program as software is also made easy.

Figure 8:
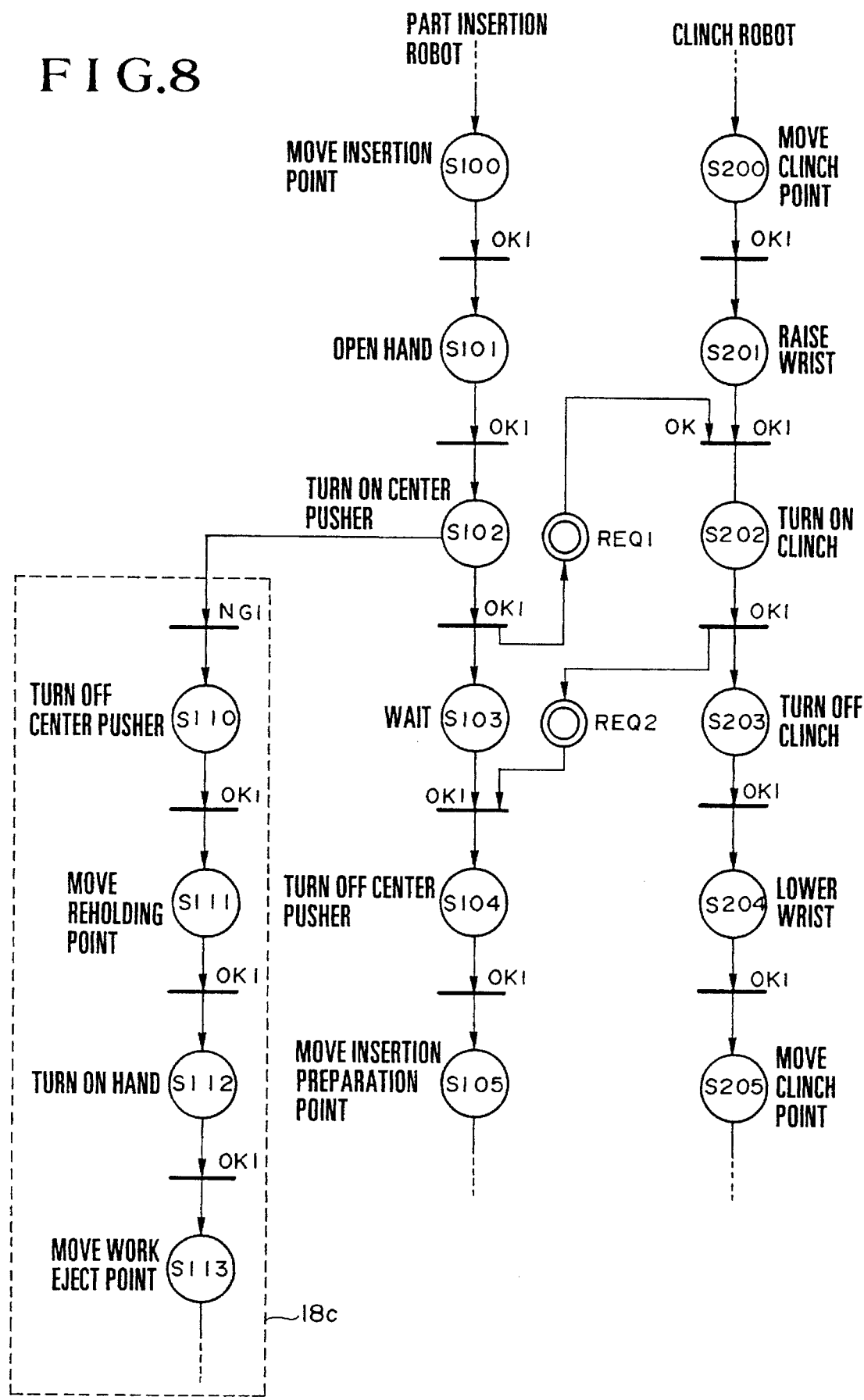
FIG. 8 is a diagram showing another example of a Petri net obtained by adding a module of operation sequence to the Petri net shown in FIG. 3.

FIG. 8 shows an example in which a module 18c is added to the Petri net shown in FIG. 3. A module is a partial control program. The operation sequence of the module 18c is an example of description of error processing conducted when insertion of the part 26 of the part insertion robot 19 has failed. The module 18c determines that when the center pusher 28 cannot lower to a predetermined height within a fixed time, insertion of the part 26 is considered to have failed for the same reasons and the part 26 is held again and exhausted.

In the cell control program editing unit 1 according to the present invention, a method of modification to add cell control program 2 can be made easily in the form of adding a module to the Petri net. Owing to such construction of the Petri net using modules, division of labor to make modules becomes possible in developing the cell control program 2. The cell control program editing unit 1 has a function of supporting such program development with modules. To be specific, program registration for each module is made possible. When developing the program for performing control over the entire cell 10, these modules are called occasion demands and linked on the net editing window 11, and the final cell control program 2 can thus be produced. If division of labor in developing the cell control program 2 is thus facilitated, the development efficiency of the cell control program can be improved.

An alternative method as described below can also be implemented. In constructing a cell of FA system, modules of operation sequences of general purpose units frequently used are stored in the data base as ready-made modules. In newly constructing a cell, cell configuration data (information such as the types of units and specific I/O assignment) are input. Suitable modules according to the cell configuration are automatically called from the data base and linked to generate the final cell control program 2.

Figure 9:
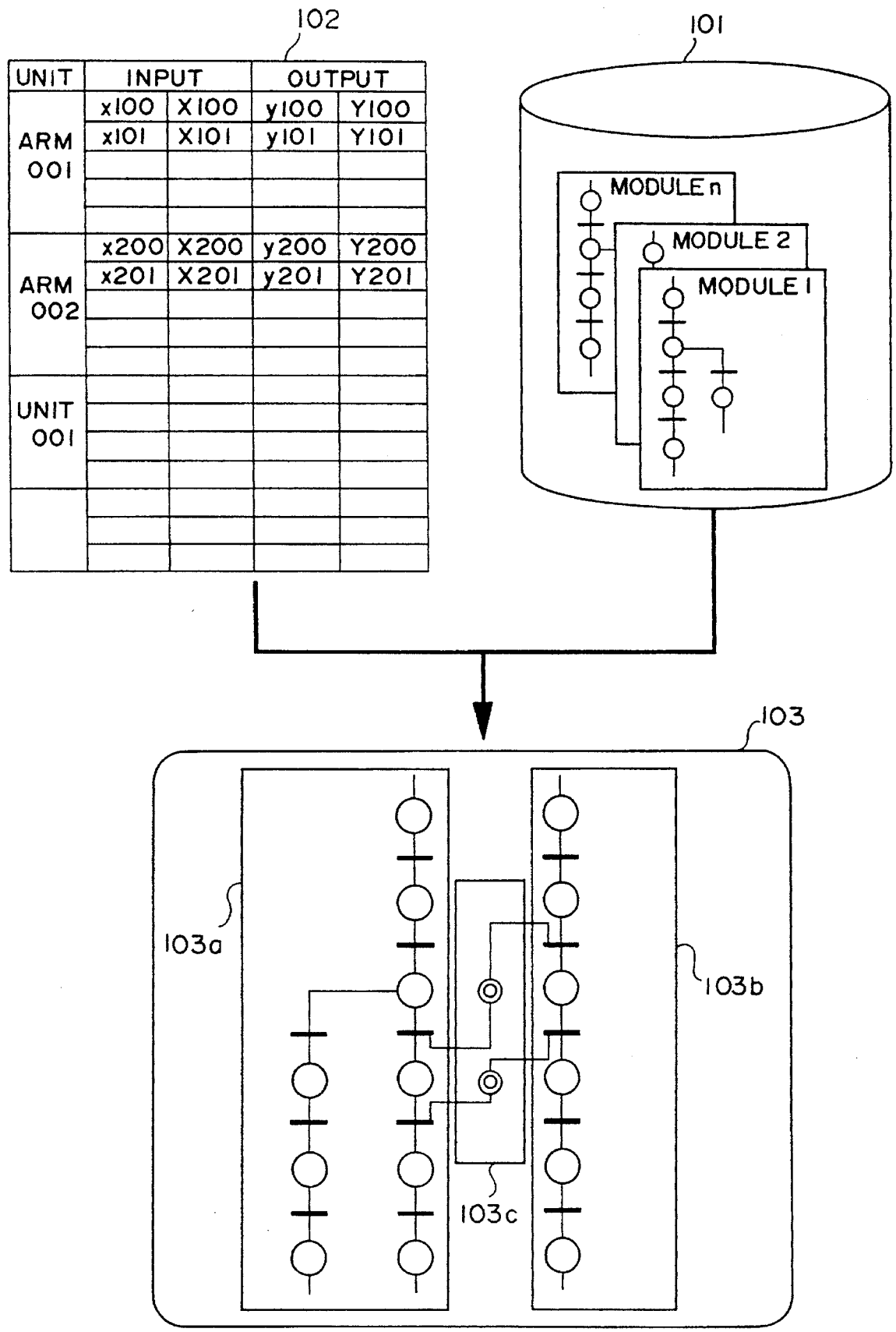
FIG. 9 is a diagram illustrating a method for generating a cell control program by using a data base of the module of operation sequence.

FIG. 9 is a diagram showing the outline of a method for generating the cell control program 2 by using the data base of modules of an operation sequence. In a data base 101 of operation sequence modules, modules of operation sequences of general purpose devices are stored. By inputting cell configuration data 102, such as kinds of units forming the cell (ARM 001, ARM 002, UNIT 001) and information (for example, the local argument xIOO in the module corresponds to the actual port XlOO) of assignment of control signals of actuators and sensor signals of the units to I/O ports, necessary modules are automatically called from the data base 101. Called modules 103a and 103b are displayed on the screen of the cell control program editing unit 1 in a diagrammatic form of a Petri net. By connecting state places to be synchronized via a synchronizing place 103c, the modules 103a and 103b are linked and a cell control program 103 according to the cell configuration data 102 can be generated.

Figure 10:
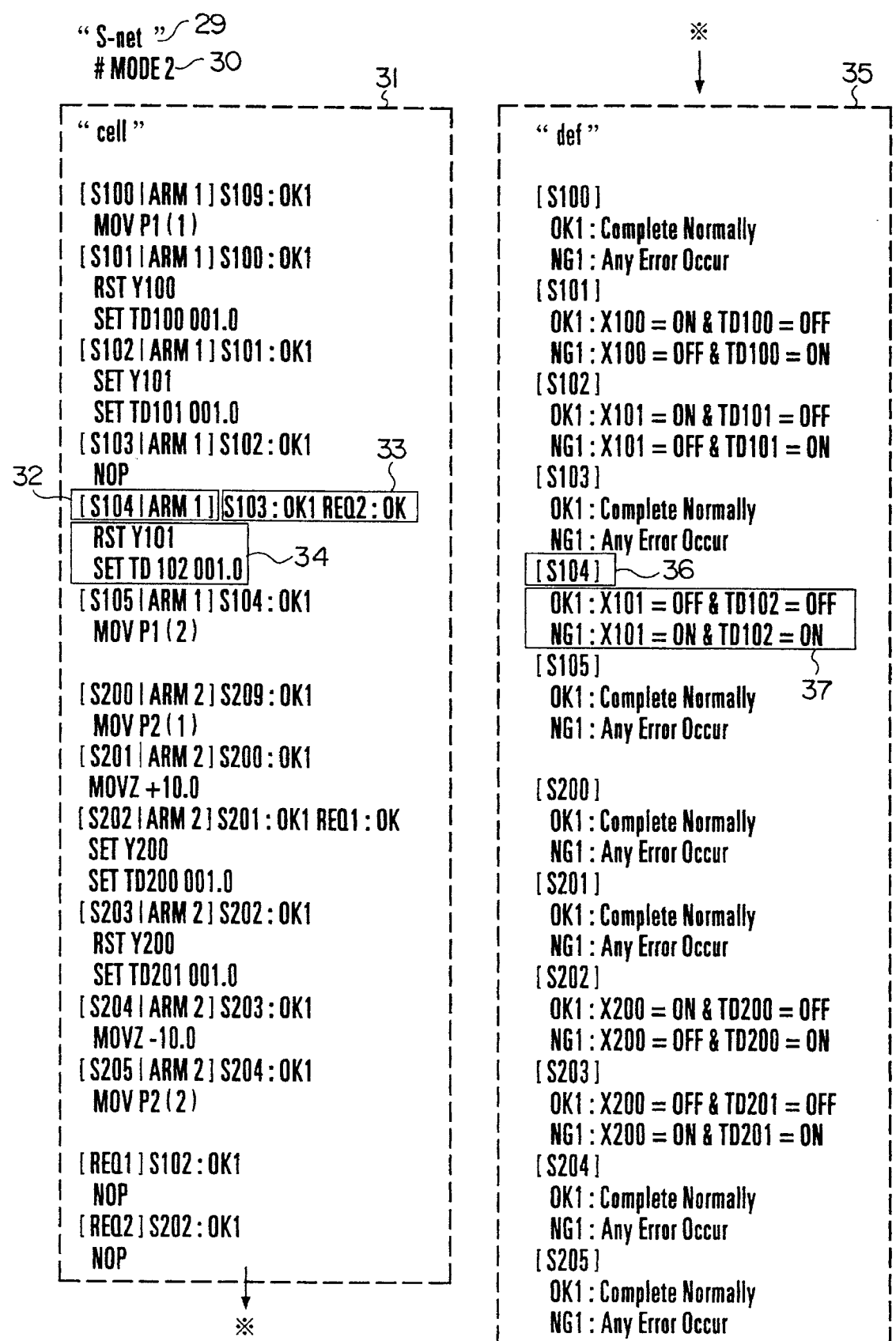
FIG. 10 is a diagram showing a cell control program obtained by encoding the Petri net shown in FIG. 3.

FIG. 10 shows the cell control program 2 obtained by encoding the Petri net shown in FIG. 3 which is edited by means of the cell control program editing unit 1. The cell control program editing unit 1 automatically encodes the edited Petri net by itself. In the cell control program 2 of FIG. 10, a net type 29 is a statement declaring whether the program described thereafter is a portion defining the operation sequence of units in the cell 10 (S-net: Sequence net) or a portion defining the transition rule of the operation mode of the cell 10 as a whole (M-net: Mode net). A mode number 30 is a statement declaring which operation mode includes the sequence of the program described thereafter, using a reference number of the operation mode.

In the example shown in FIG. 10, the operation sequence of units in the second operation mode is described. In a cell block 31, connection relations of the Petri net and operation of units in each state are defined. In a "cell" labelled 32, a reference number of the state and the type and reference number of the unit which executes the operation in that state are defined.

The unit in the state S104 included in the cell block 31 is ARM1. ARM1 indicates the part insertion robot 19 which is the first robot, and peripheral devices annexed to the part insertion robot 19 such as the hand 24. A transition condition expression 33 is an expression defining the connection relations of the Petri net. The transition condition expression 33 defines the reference number of a state connected to the input transition of that state as input and the end condition of that state. The input transition of the state S104 is connected to the normal end OK1 of the state S103 and OK of the synchronizing place REQ2. A command block 34 commands defining operations of machines or devices forming the unit in that state and other processing. Processing in the state S104 is RST Y101 (turning off the output Y101, i.e., rise of the center pusher 28) and SET TD102 001.0 (setting an on-delay timer TD102). In a "def" block 35 (in this case, "def" means definition), end conditions of respective states are defined. In a "def" label 36, the reference number of the state is defined. In a definition expression 37, condition expressions of normal end (OK) and abnormal end (NG) are defined.

The normal end condition (OK1) of the state S104 is X101=OFF (input X101 is off, i.e., the sensor of the center pusher 28 is off) and TD102=OFF (on-delay timer TD102 is off, i.e., it is not in the timer completion state). The abnormal end condition (NG1) of the state S104 is X101=ON and TD102=ON (even if the on-delay timer TD102 is in the timer completion state, the sensor of the center pusher 28 remains on).

Figure 11:
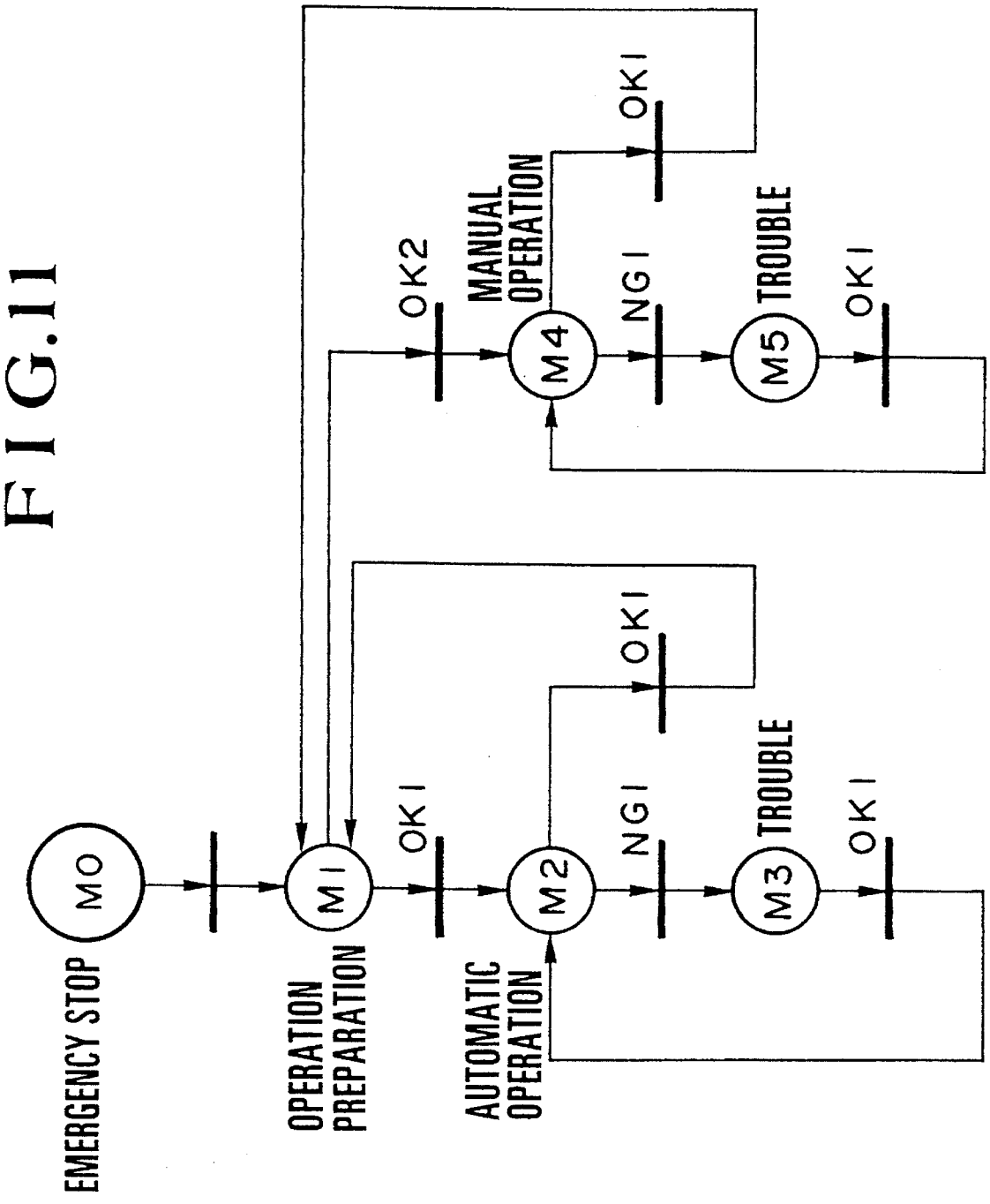
FIG. 11 shows an example of a description of an M-net by using a Petri net.

FIG. 11 shows an example in which the M-net 39 is described using a Petri-net. In the M-net 39, a place represents an operation mode and a transition represents a transition condition of the operation mode. In an operation preparation mode M001, for example, it is represented that a transition to either an automatic operation mode M002 or a manual operation mode M004 is made depending on the difference of condition (such as on/off of buttons on the control panel).

FIG. 12 shows a result obtained by encoding a part of the Petri net of FIG. 11. In the same way as the S-net 38, connection relations of the Petri net and processing to be conducted when transition to each operation mode has been made are described in a "cell" block of FIG. 12, and end conditions of respective operation modes are described in a "def" block. If transition to the automatic operation mode M002 is made, for example, then execution of state S050 and state S150 is started, output Y002 is turned on (automatic operation indication lamp of the control panel is lit), and Y000 is turned off (stop display lamp is extinguished). Furthermore, the condition of normal end (OK1) of the automatic operation mode M002 is that the input X002 is on (i.e., a stop button of the control panel is depressed).

Figure 13:
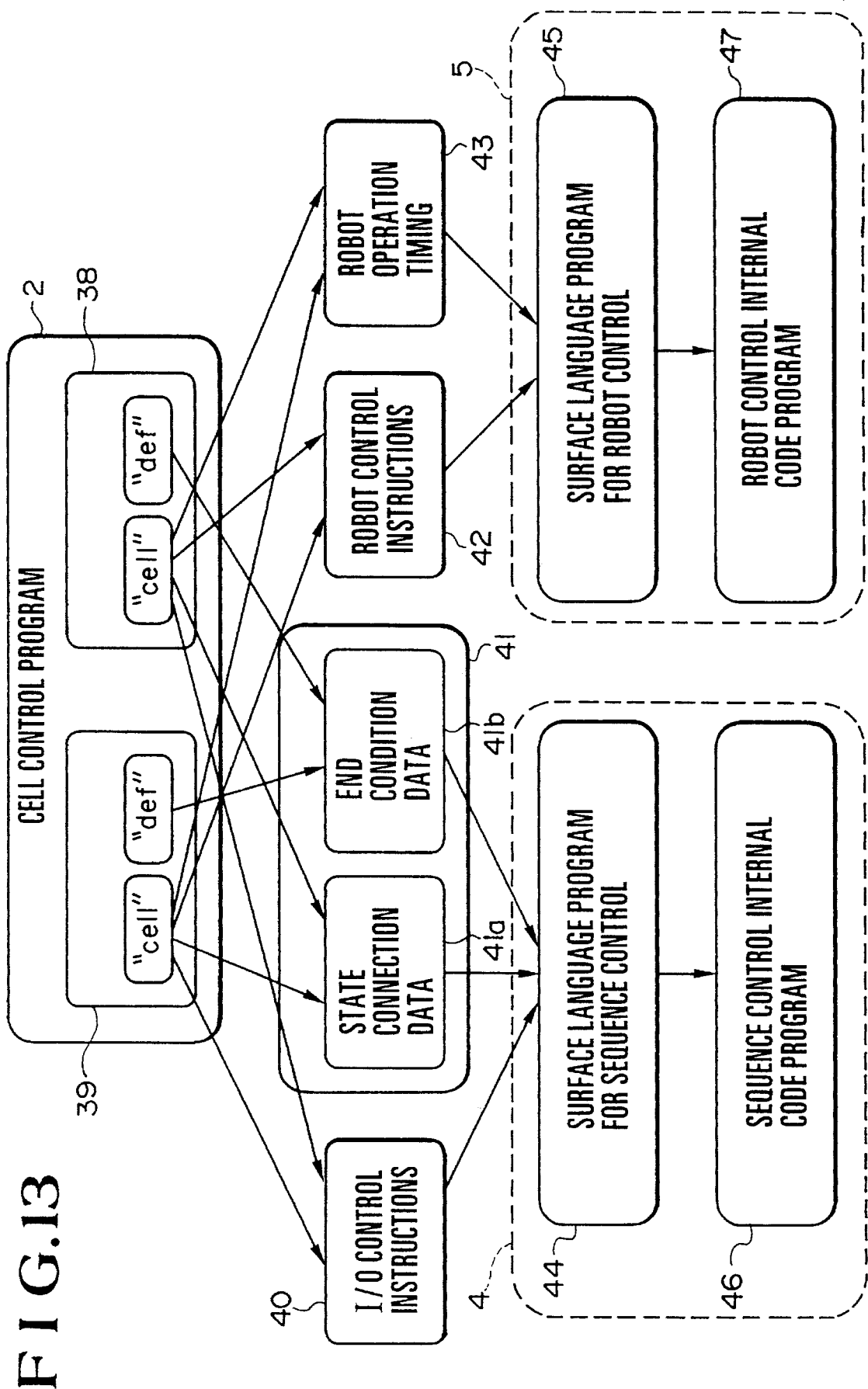
FIG. 13 is a diagram showing a code generation algorithm of cell control program conversion means for generating a sequence control program and a robot control program from a cell control program according to the present invention.

FIG. 13 shows a code generation algorithm of the cell control program conversion unit 3. The code generation algorithm generates a sequence control program 6 and a robot control program 7 from the cell control program 2 as shown in FIG. 10. In the sequence control program 6, processing for controlling of operation sequence of the robots and various peripheral machines or devices (units) and for performing control over I/Os connected to these devices is described. In the robot control program 7, processing for control over positioning and operation trajectory of the robot is described. The cell control program 2 includes an S-net 38 which is a portion for defining the operation sequence of the units included in the cell 10 and an M-net 39 which is a portion for defining the transition rule of the operation mode of the cell 10 as a whole. Furthermore, each of the S-net 38 and the M-net 39 includes a "cell" block and a "def" block.

In the "cell" block, connection relations of respective states of the Petri net and operation of the units in respective states are defined. In the "def" block, end conditions of respective states are defined. The cell control program conversion unit 3 first extracts state connection data 41a from contents of the "cell" block of the M-net 39 and the "cell" block of the S-net 38 and extracts end condition data 41b of respective states from contents of the "def" block of the M-net 39 and the "def" block of the S-net 38. The state connection data 41a and the end condition data 41b are put together to form sequence control data 41. Furthermore, the cell control program conversion unit 3 extracts I/O control instructions 40 from the "cell" block of the M-net 39 and the "cell" block of the S-net 38, and first generates a surface language program for sequence control 44 from the I/O control instructions 40 and the above described sequence control data 41. Furthermore, this surface language program for sequence control 44 is converted to a sequence control internal code program 46 having a binary form suitable for interpretation and execution processing made by the interpreter (sequence control program interpretation and execution unit 6) in the controller at high speed. The surface language program for sequence control 44 and the sequence control internal code program 46 are named generically as sequence control program 4.

Furthermore, the surface language for sequence control in the present embodiment is based upon description of a rule in IF-THEN form. In processing described in each rule, evaluation expressions concerning the execution status of operation of a unit in each state, input signals supplied from outside such as a sensor, and values of internal variables are used as conditions. If predetermined conditions are satisfied, then operation of the unit in that state is finished and operation of the unit in the next state is started. Such processing is described in each rule.

In the surface language program for sequence control 44, such a representation form that the user who sees it can intuitively understand contents is mainly intended. If occasion demands, program editing on this surface language level is also possible.

Furthermore, the cell control program conversion unit 3 extracts robot control instructions 42 from the "cell" block of the M-net 39 and the "cell" block of the S-net 38. Concurrently therewith, the cell control program conversion unit 3 extracts a reference number of the state in which these robot control instructions 42 are executed (hereafter referred to as state No.), i.e., information indicating robot operation timing 43. On the basis of these kinds of extracted information, the cell control program conversion unit 3 generates a surface language program for robot control 45.

Furthermore, the surface language program for robot control 45 is converted to a robot control internal code program 47 having a binary form suitable for interpretation and execution made by the interpreter (robot control program interpretation and execution unit 7) included in the controller.

The surface language program for robot control 45 and the robot control internal code program 47 are called collectively robot control program 5. In the same way as the surface language program for sequence control 44, the surface language program for robot control 45 is intended for easy understanding by the user. As occasion demands, program editing on the surface language level is also possible.

Figure 14:
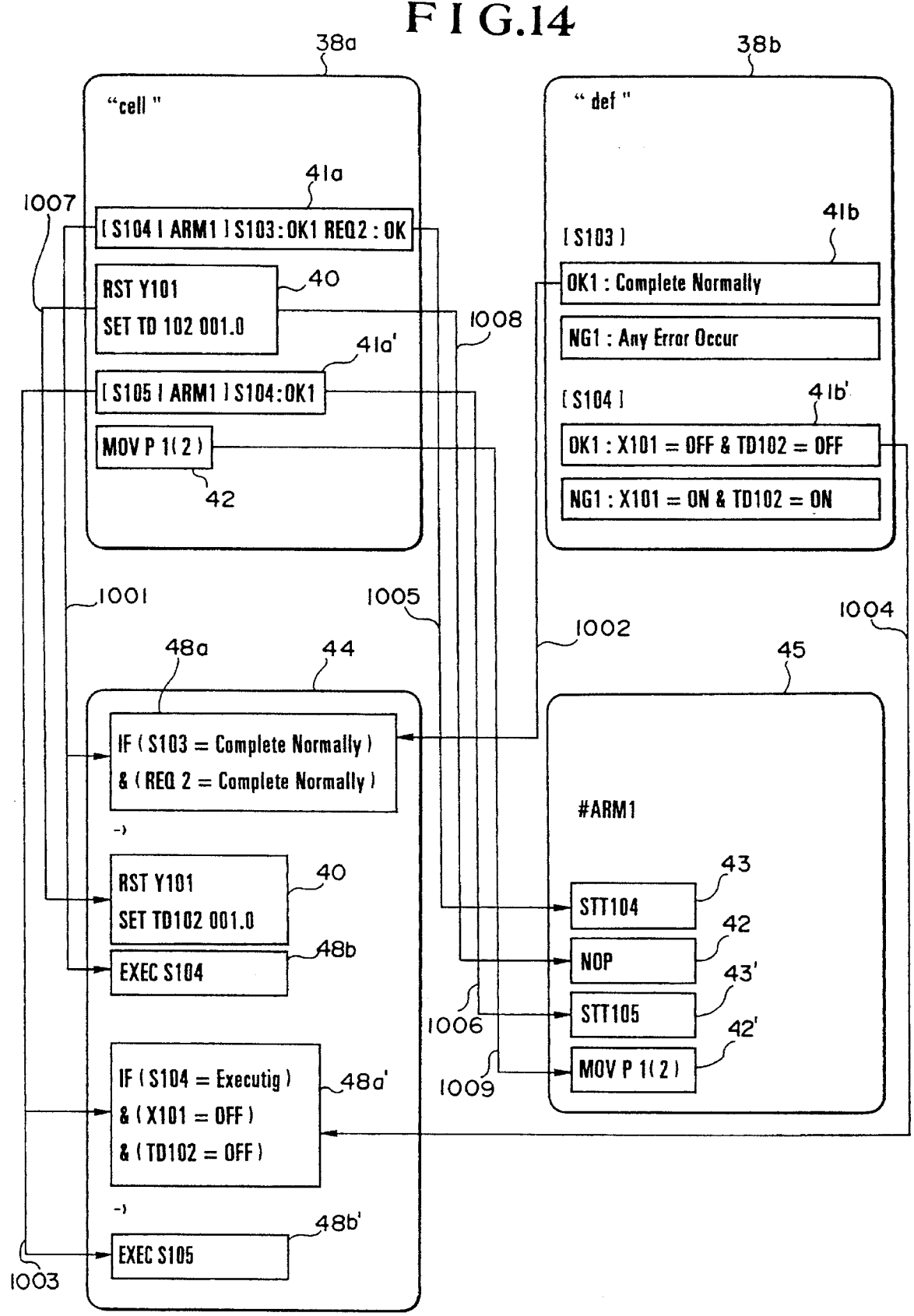
FIG. 14 is a diagram specifically illustrating a procedure for generating the sequence control program and the robot control program.

FIG. 14 specifically shows the procedure for generating the sequence control program 4 and the robot control program 5 on the basis of the algorithm shown in FIG. 13 by taking a part of the cell control program 2 of FIG. 10 as an example. In FIG. 14, 38a and 38b denote parts of the "cell" block and the def block of the S-net 38 of the cell control program 2, respectively. In the cell block 38a, a combination of a "cell" label 32 and a state transition expression 33 is state connection data 41a and 41a' of the Petri net.

The state connection data 41a of FIG. 14 indicates that the input transition to the state S104 is single and the normal end OK1 of the state S103 and OK of the synchronizing place REQ2 are connected to the transition as inputs. In the same way, another state connection data 41a' indicates that the input transition of the state S105 is single and OK1 of the state S104 is connected to the transition.

Furthermore, in the def block 38b, end conditions of respective states are defined. End condition data 41b of normal end OK1 of the state S103 indicates that operation in the state S103 is completed without an error (complete normally). In the same way, end condition data 41b' of OK1 of the state S104 indicates that the input X101 is off and the on-delay timer TD102 is not in the timer completion state.

From the state connection data 41a and the end condition data 41b, an antecedent portion 48a of a rule in the surface language program for sequence control 44 and a state transition instruction 48b (EXEC S104) of a consequent portion are generated (processing 1001 and 1002). That is, "if the state S103 ends normally and the synchronizing place REQ2 is satisfied" is generated as the antecedent portion 48a, and "the state S104 is executed (i.e., an activation flag and an execution flag of the state S104 are set)" is generated as the state transition instruction 48b.

In the same way, from state connection data 41a' and end condition data 41b', an antecedent portion 48a' of the rule and a state transition instruction 48b' of the consequent portion of that rule are generated (processing 1003 and 1004).

At this time, from the cell label included in the state connection data 41a and 41a', state No. i.e., robot operation timing 43 and 43' are extracted simultaneously, and state label instructions included in the surface language program for robot control 45 are generated (processing 1005 and 1006).

Furthermore, I/O control instructions 40 is extracted from command block of the "cell" block 38a, and the instructions of the consequent portion of the rule in the surface language for sequence control 44 is generated (processing 1007).

Robot control instructions 42 are extracted from command block of the "cell" block 38a, and the instructions of the surface language program for robot control 45 are generated (processing 1008 and 1009).

By referring to FIG. 14, the case of S-net has been described. In case of M-net as well, however, conversion can be done in the same way.

Furthermore, in FIGS. 13 and 14, the I/O control instructions 40 is transferred entirely to the sequence control program 4. Alternatively, a part of these I/O control instructions 40 may be transferred to the robot control program 5.

In the code generation algorithm shown in the cell control conversion unit 3 of FIG. 13, the "cell" block consists of connection relations of states of the Petri net and unit operations in respective states and the "def" block consists of end conditions of respective states. Even if the cell control program 2 is described in a different form, however, code generation is possible in the same way. For example, even in such a description form that unit operations in respective states are collected into one block and connection relations and end conditions of respective states are collected into another block, a code generation algorithm similar to that of FIG. 13 is also applicable.

Furthermore, even in such a description form that state connection relations, unit operations in respective states, and state end conditions are respectively collected into three separate blocks, a code generation algorithm similar to that of FIG. 13 is also applicable.

FIG. 15 shows the surface language program for sequence control 44 generated from the cell control program 2 shown in FIG. 10. FIG. 16 shows the surface language program for robot control 45. In processing of a rule 48 shown in FIG. 15, if state S201 ends normally and synchronizing place REQ1 ends normally, output Y200 and on-delay timer TD200 are set and the execution status of the state S202 is changed to executing (EXECS S202).

Robot control instruction 49 is an instruction for raising the wrist of ARM2 by 10 mm (MOVZ+ 10.0) in the state S201 (STT 201).

Figure 17:
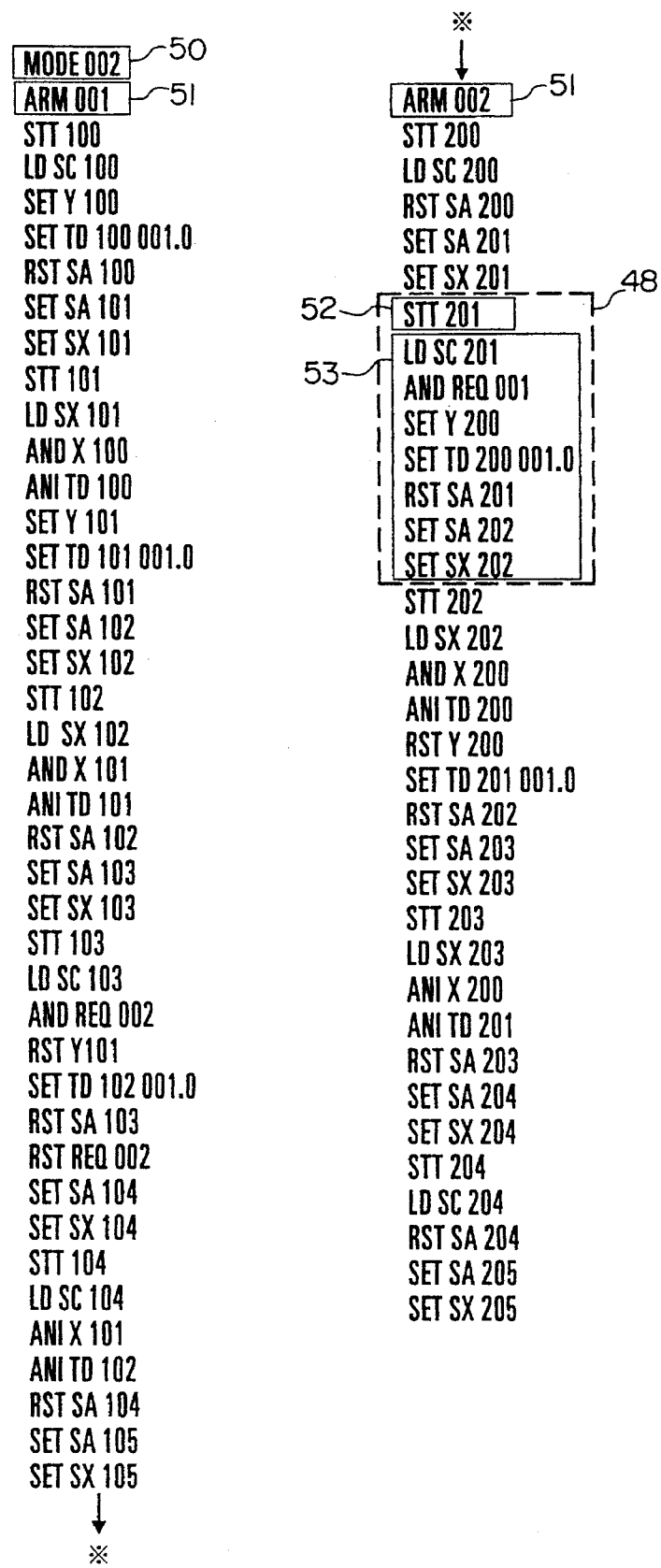
FIG. 17 is a diagram showing a sequence control internal code program in Mnemonic expression generated from the surface language program for sequence control shown in FIG. 15 according to the present invention.

FIG. 17 shows a result obtained by converting the surface language program for sequence control 44 of FIG. 15 to the sequence control internal code program 46. FIG. 18 shows a result obtained by converting the surface language program for robot control 45 of FIG. 16 to the robot control internal code program 47.

Internal codes of FIGS. 17 and 18 are represented by converting binary codes to mnemonic codes. In the sequence control internal code program 46 of FIG. 17, instruction codes for conducting predetermined processing are described for each state of each unit in each operation mode. By a mode label 50, a unit label 51, and a state label 52, the start address of instruction codes in the program is specified. After the state label 52, instruction codes 53 is described. In the robot control internal code program 47 of FIG. 18 as well, the start address of internal codes for defining processing in each state is specified by such labels.

Figure 19:
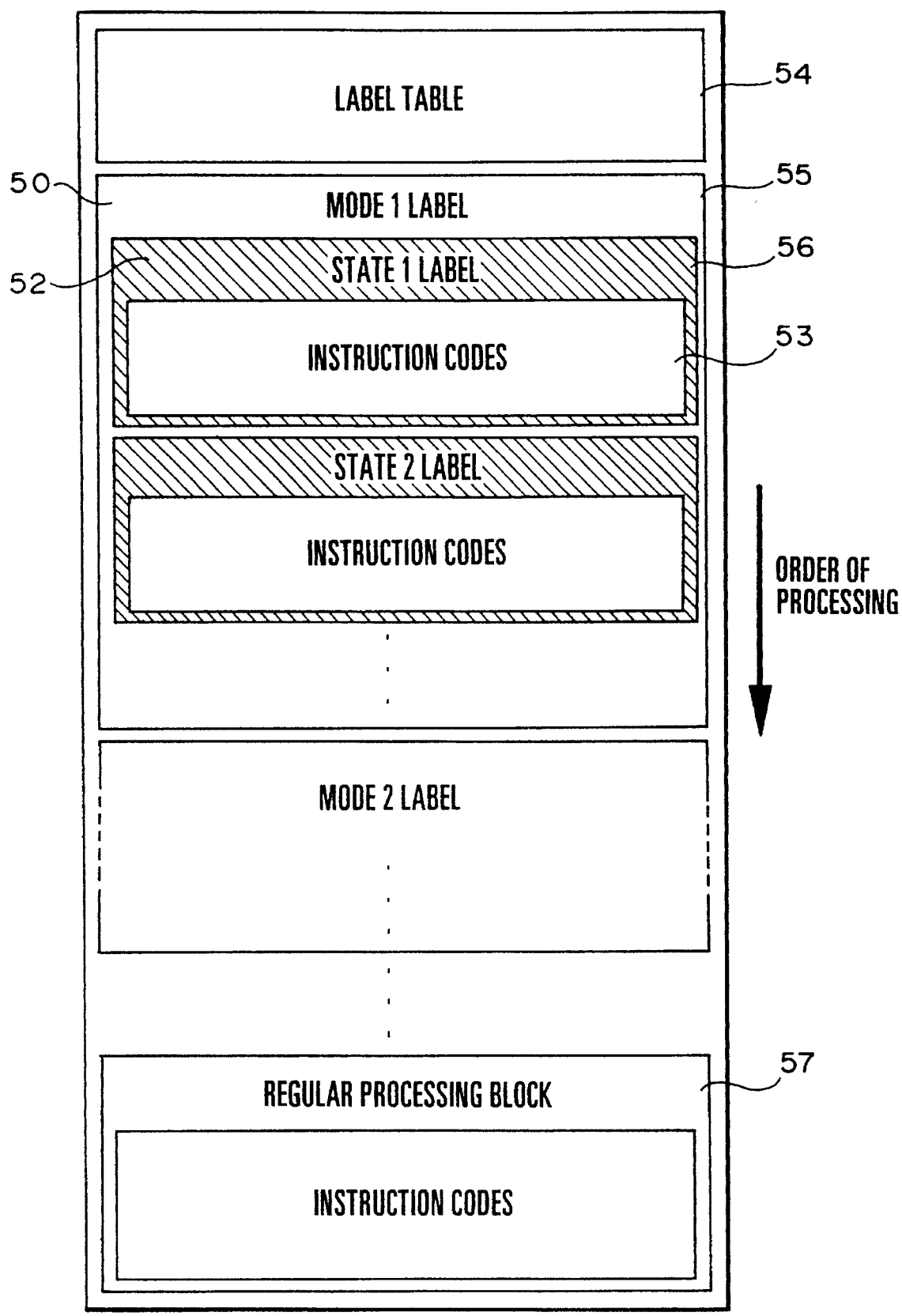
FIG. 19 is a diagram showing the general configuration of the sequence control internal code program used in the apparatus of the present invention.
Figure 20:
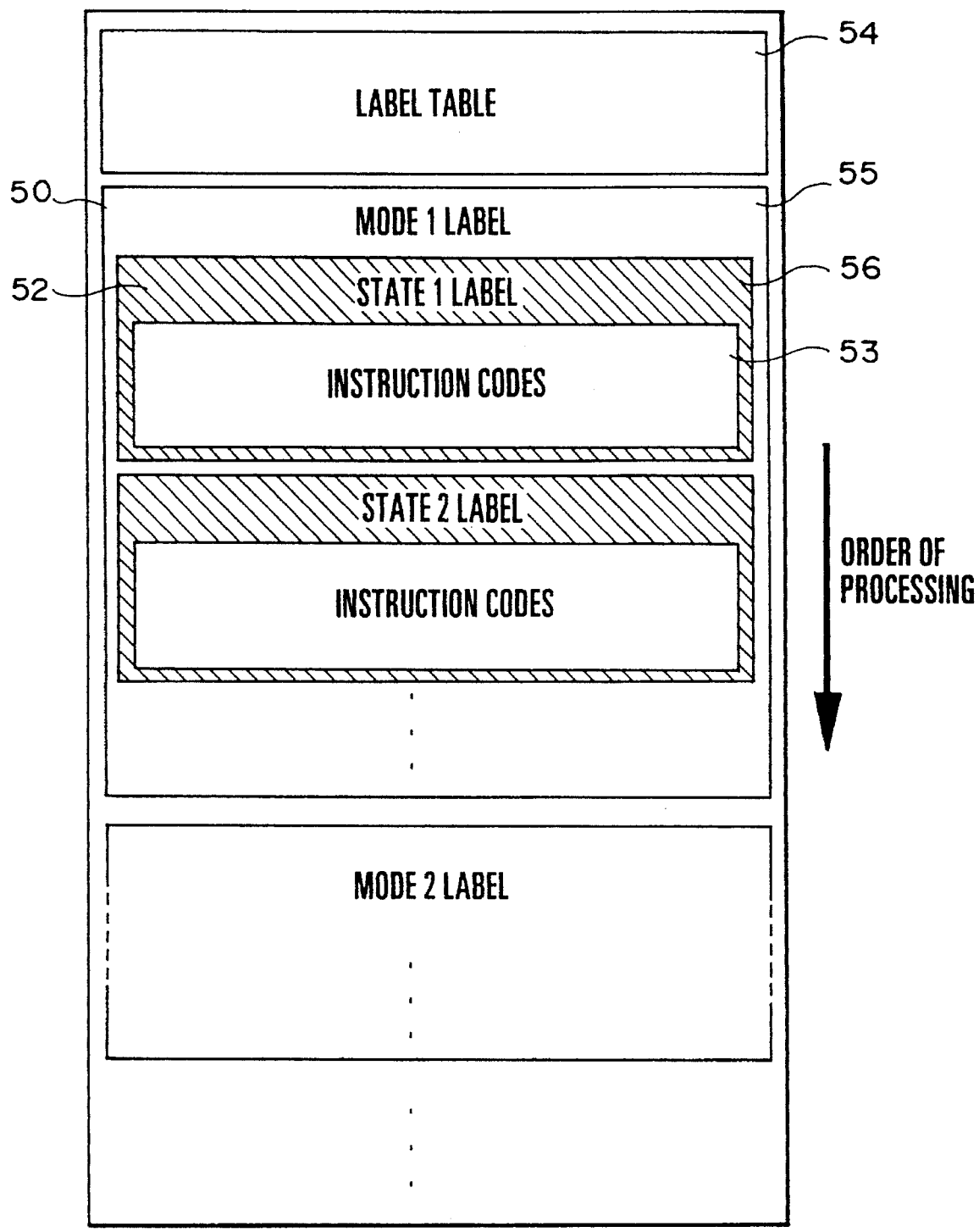
FIG. 20 is a diagram showing the general configuration of the robot control internal code program used in the apparatus of the present invention.

FIG. 19 and FIG. 20 show general configurations of the sequence control internal code program 46 and the robot control internal code program 47, respectively. With reference to FIG. 19, a label table 54 is located at the top of the program. The label table 54 defines program addresses of the mode label 50, the unit label 51, and the state label 52. In a mode block 55, processing relating to S-net 38 is described. The processing relating to S-net 38 is an operation sequence of each unit in the operation mode specified by the mode label 50. In a state block 56 included in the mode block 55, sequence processing having the state specified by the state label 52 as an activation condition (processing corresponding to the rule 48 in the surface language program 44) is described as instruction codes 53. In a regular processing block 57, contents to be processed regularly without regard to the operation mode (such as processing relating to M-net 39, timer or counter processing, interlock processing) are described.

Code configuration of FIG. 20 is the same as that of FIG. 19 except that the regular processing block 57 is not present.

Figure 21:
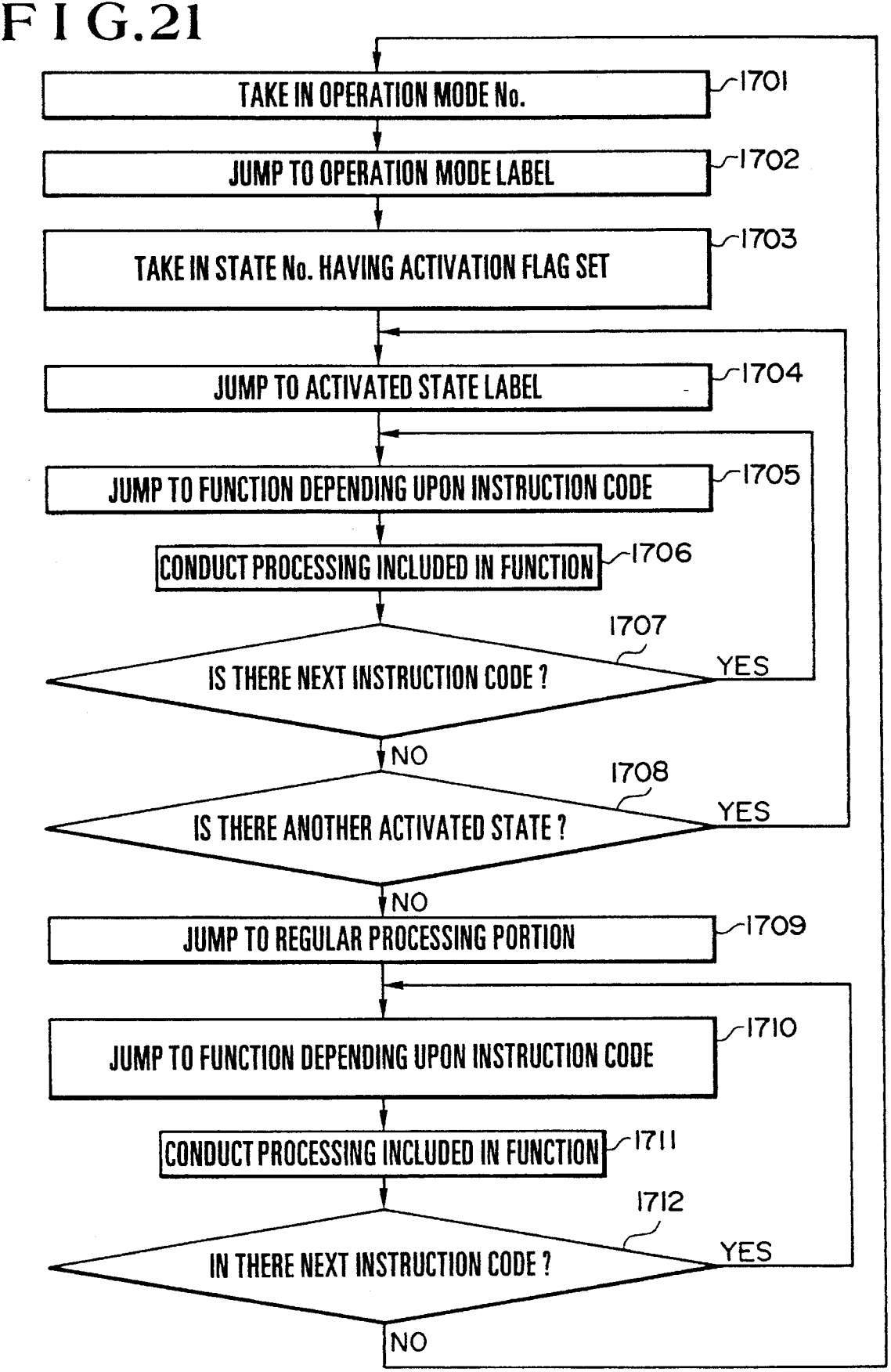
FIG. 21 is a diagram showing a processing flow of an interpreter of a sequence control internal code in a sequence control program interpretation and execution means included in the apparatus of the present invention.

FIG. 21 shows the processing flow of the internal code interpreter for sequence control in the sequence control program interpretation and execution unit 6 according to the present invention. First of all, the interpreter takes in current operation mode No. from a variable for storing operation mode No. (processing 1701) and jumps to the address of the mode label 50 indicating the current operation mode, included in the sequence control internal code program 46 (processing 1702).

Then, the interpreter takes in a state No. having an activation flag SA set, from a buffer for storing the state No. and execution status (activation flag SA, executing flag SX, normal end flag SC, and abnormal end flag SE) (processing 1703). The state No. and execution status are data automatically updated by the interpreter on the basis of the processing result of various instruction codes. For one state, one state No. and four types of the above described flags are prepared. The fact that the activation flag SA is set means that operation in that state has become practicable. In the same way, the executing flag SX indicates that operation in that state is being executed at the present time. The normal end flag SC indicates that operation in that state has ended normally. The abnormal end flag SE indicates that some error has occurred during execution of operation in that state.

On the basis of the state No. having the activation flag SA set, a jump is made to the state label 52 indicating the activated state included in the sequence control internal code program 46 (processing 1704). The instruction codes 53 described next to the state label 52 are interpreted and executed in order. That is to say, a jump is made to a function in which the actual contents of processing of instruction codes are defined (processing 1705). As many operands as need be are taken in from the sequence control internal code program 46 and processed (processing 1706).

When the processing included in the function is finished, it is checked whether there is an instruction code following it (processing 1707). If there is an instruction code, its processing of interpretation and execution is conducted.

If there is no following instruction code, i.e., if processing of the instruction code train 53 has been completed, then it is determined whether there is a different activated state (processing 1708). If there is a different activated state, a jump is made to the state label 52 indicating its activated state and the above described processing is repeated. If there is not another activated state, then a jump is made to the regular processing portion 57 of the sequence control internal code program 46 (processing 1709) and processing of the instruction codes 53 are conducted (processings 1710, 1711 and 1712).

If processing of regular processing block has been completed, then return to the beginning of this processing flow is made and the above described processing is repeated. By thus jumping to the state label of the activated state and processing only the instruction codes following the state label, it is possible to monitor only information to be monitored under the current activated state, i.e., only the external I/O signal and values of internal variables. It is thus possible to shorten the time required for processing of the sequence control internal code program 46.

Figure 22:
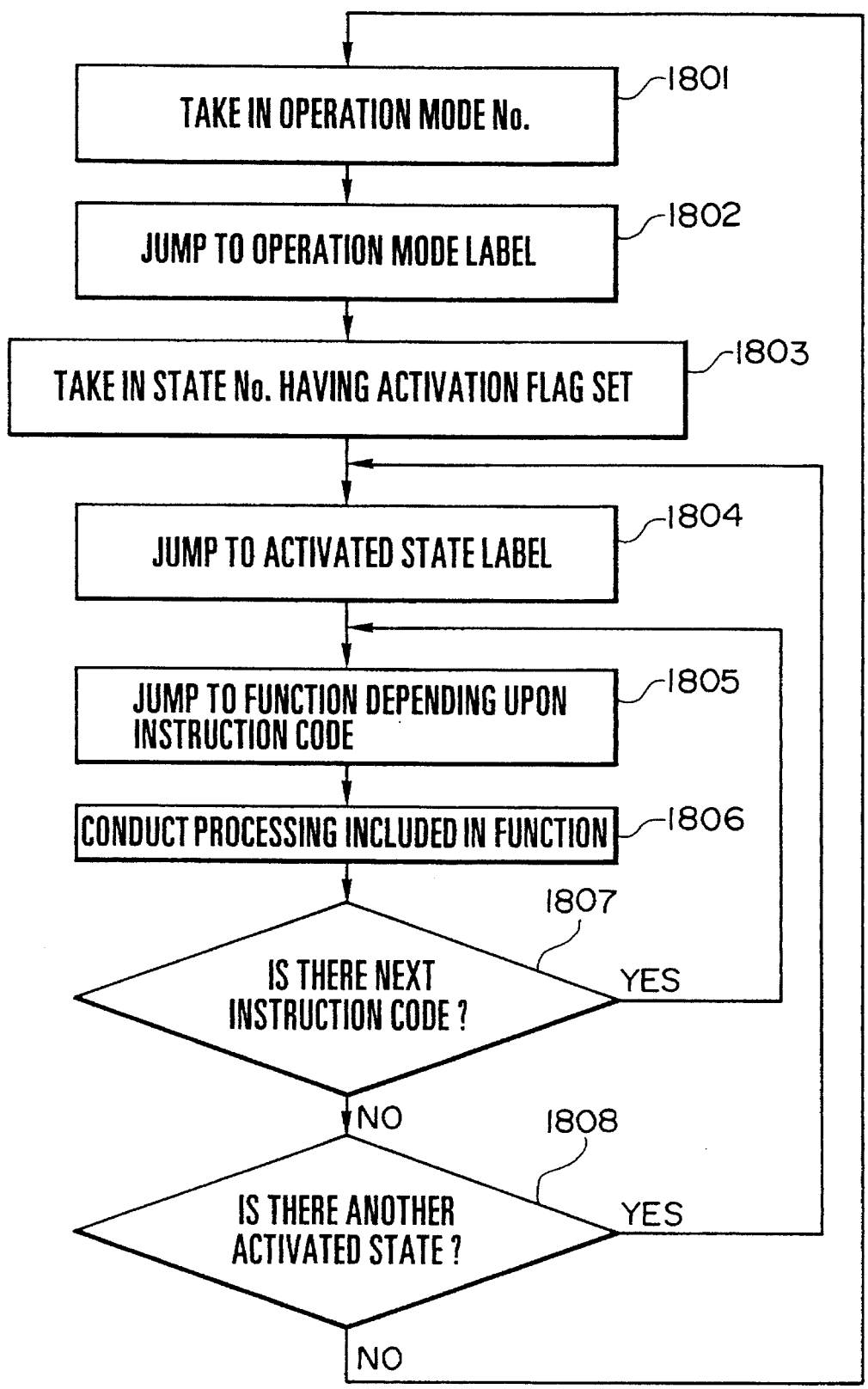
FIG. 22 is a diagram showing a processing flow of an interpreter of a robot control internal code in a robot control program interpretation and execution means included in the apparatus of the present invention.

FIG. 22 shows the processing flow of the internal code interpreter for robot control in the robot control program interpretation and execution unit 7 according to the present invention. Processing flow of FIG. 22 is the same as that of FIG. 21 except the portion relating to the regular processing portion 56.

Figure 23:
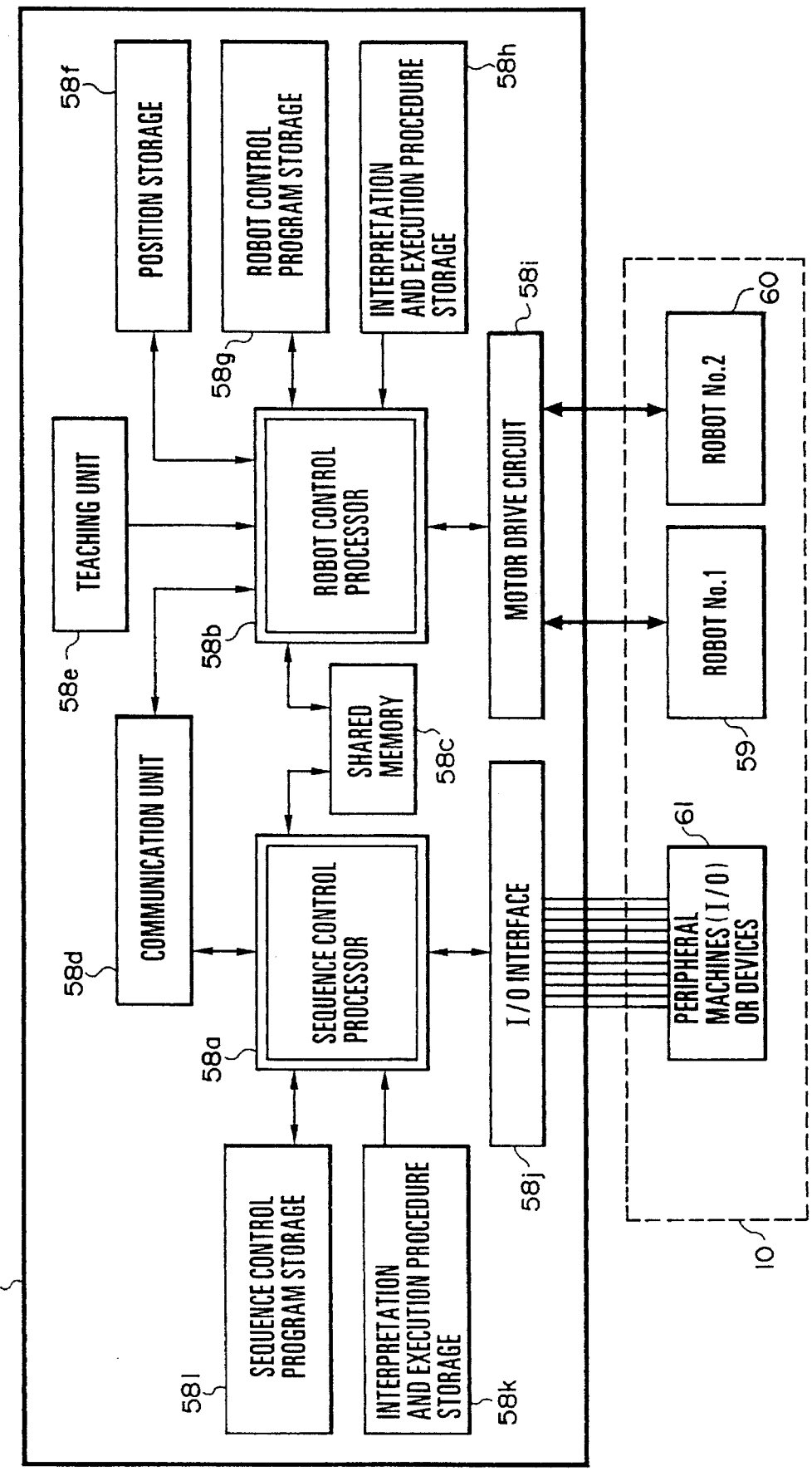
FIG. 23 is a diagram showing the configuration of an example of interpretation and execution unit for a sequence control program and a robot control program shown in FIG. 1.

FIG. 23 is a block diagram showing the configuration of a cell 10 including two robots 59 and 60 and peripheral machines or devices 61 and a controller 58 for controlling the cell 10, wherein the FA system control apparatus according to the present invention shown in FIG. 1 is applied. The controller 58 corresponds to the sequence control program interpretation and execution unit 6 and the robot control program interpretation and execution unit 7 shown in FIG. 1. The controller 58 and the cell control program conversion unit 3 (not shown in FIG. 23) may be disposed separately as shown in FIG. 23, or may be produced as one body. In this controller 58, a sequence control processor 58a and a robot control processor 58b are bus-connected by means of a shared memory 58c so as to exchange information closely between the sequence control processor 58a and the robot control processor 58b.

To the robot control processor 58b, a plurality of robots such as the robot No. 1 59 and robot No. 2 60 are connected via a motor drive circuit 58i. These robots 59 and 60 are controlled simultaneously.

In a robot control program storage 58g, the robot control program 5 is stored. The robot control program 5 is interpreted and executed by an interpreter stored in an interpretation and execution procedure storage 58h. By a teaching unit 58e, taught position data and movement trajectory data of the robot are stored in a position storage 58f. To a sequence control processor 58a, I/Os (not illustrated) of various peripheral machines or devices 61 are connected via an I/O interface 58j. Various peripheral machines or devices are thus monitored and controlled.

In a sequence control program storage 58l, the sequence control program 4 is stored. The sequence control program 4 is interpreted and executed by an interpreter stored in an interpretation and execution procedure storage 58k. A communication unit 58d is used to communicate with a host computer connected to the controller 58. For example, the communication unit 58d is used when the sequence control program 4 and the robot control program 5 are to be transferred from a another computer on which the cell control program conversion unit 3 is mounted to the controller 58.

In this way, a single controller 58 having the sequence control processor 58a and the robot control processor 58b subjected to bus coupling by means of the shared memory 58c can control all of the robots and peripheral machines or devices included in the cell 10 of FA system having a certain scale.

In the controller 58, various kinds of information concerning operation states of respective units included in the cell 10 (such as execution status of unit operation in respective states, input signals from outside such as sensors, and values of internal variables) can be shared by the sequence control processor 58a and the robot control processor 58b using the architecture of the bus coupling by means of the shared memory 58c. If both processing systems are provided with the function for managing these types of shared information, therefore, such a complicated sequence that the state of the entire cell 10 is accurately reflected in operation of respective units can also be constructed easily. In the processing flows of interpreters shown in FIGS. 21 and 22 as well, processing based on information concerning states of respective units is conducted.

Figure 24:
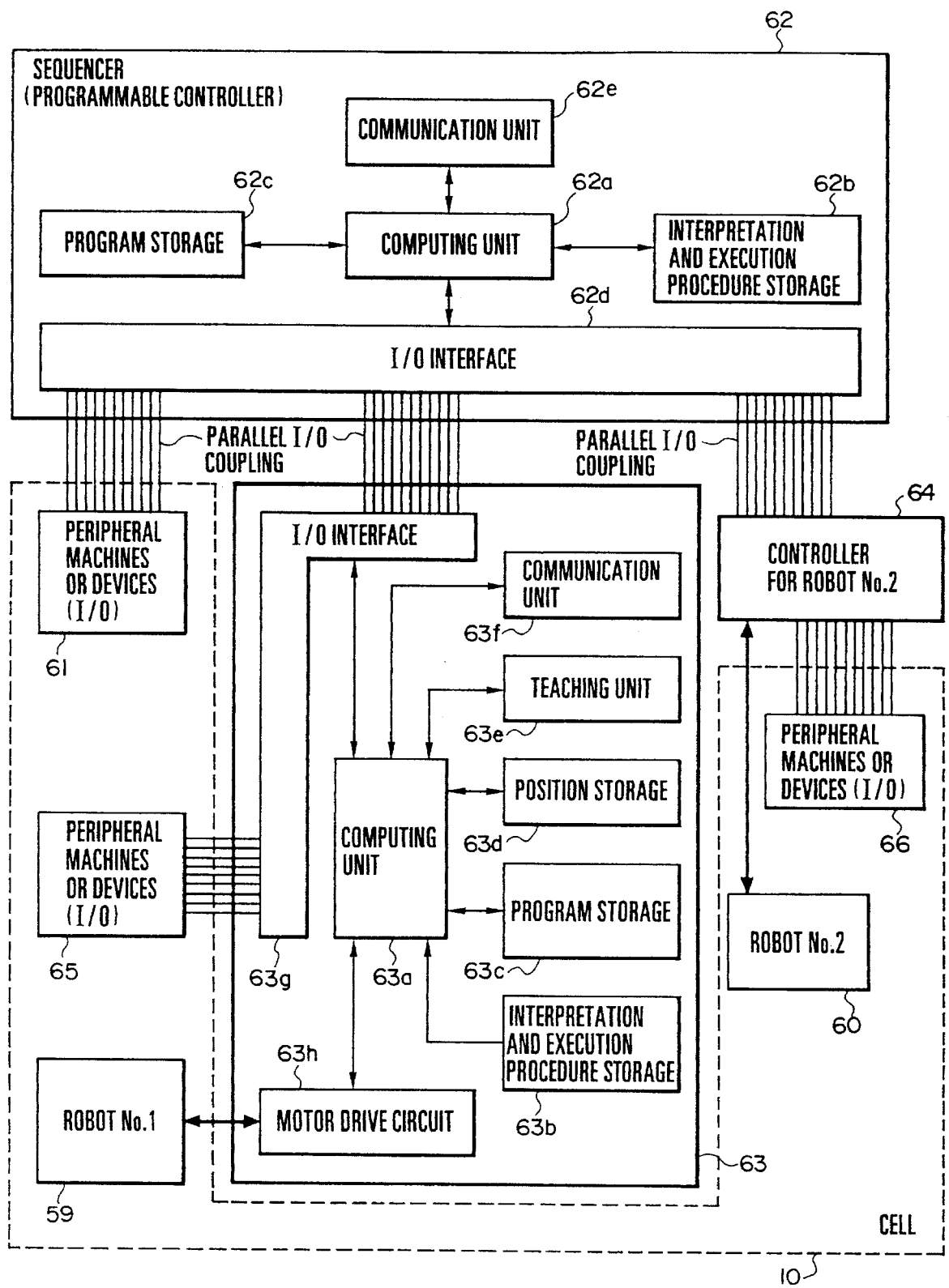
FIG. 24 is a diagram showing another example of interpretation and execution units for a sequence control program and a robot control program shown in FIG. 1.

FIG. 24 shows another example of a control apparatus according to the present invention. In this example, two robot controllers (controller 63 for robot No. 1 and controller 64 for robot No. 2) and a sequencer 62 are connected via parallel I/Os in order to control a cell 10 including two robots 59 and 60 and various peripheral machines or devices 61, 65 and 66.

In case of such a configuration, synchronization of operations of respective units are attained and sequence of the entire cell 10 is controlled using simple on/off signals passing through parallel I/Os disposed between the sequencer 62 and the robot controllers 63 and 64. That is, signal lines output from the robot controllers are connected to input ports of the sequencer 62, and signal lines output from the sequencer 62 are connected to input ports of the robot controllers 63 and 64. In respective control programs, processing is conducted using these input/output signals as branch conditions of processing and synchronization of operations of respective units is thus attained.

In this example, the cell control program conversion unit 3 has two functions. One of the functions is generating the sequence control program 4 described by using a programming language (surface language or internal codes) mounted on the sequencer 62 and the robot control programs 5 described by using a programming language (surface language or internal codes) mounted on the robot controllers 63 and 64 from the cell control program 1 described using a cell control language.

The other of the functions is automatically generating synchronizing processing using parallel I/Os as described above into the sequence control program 4 and the robot control programs 5 provided that connection information of parallel I/Os between the sequencer 62 and the robot controllers 63 and 64 is given beforehand.

Peripheral machines or devices (I/O) 65 and 66 connected to individual robot controllers 63 and 64 are controlled by I/O control commands in the robot control program 5 interpreted and executed in individual robot controllers 63 and 64.

Figure 25:
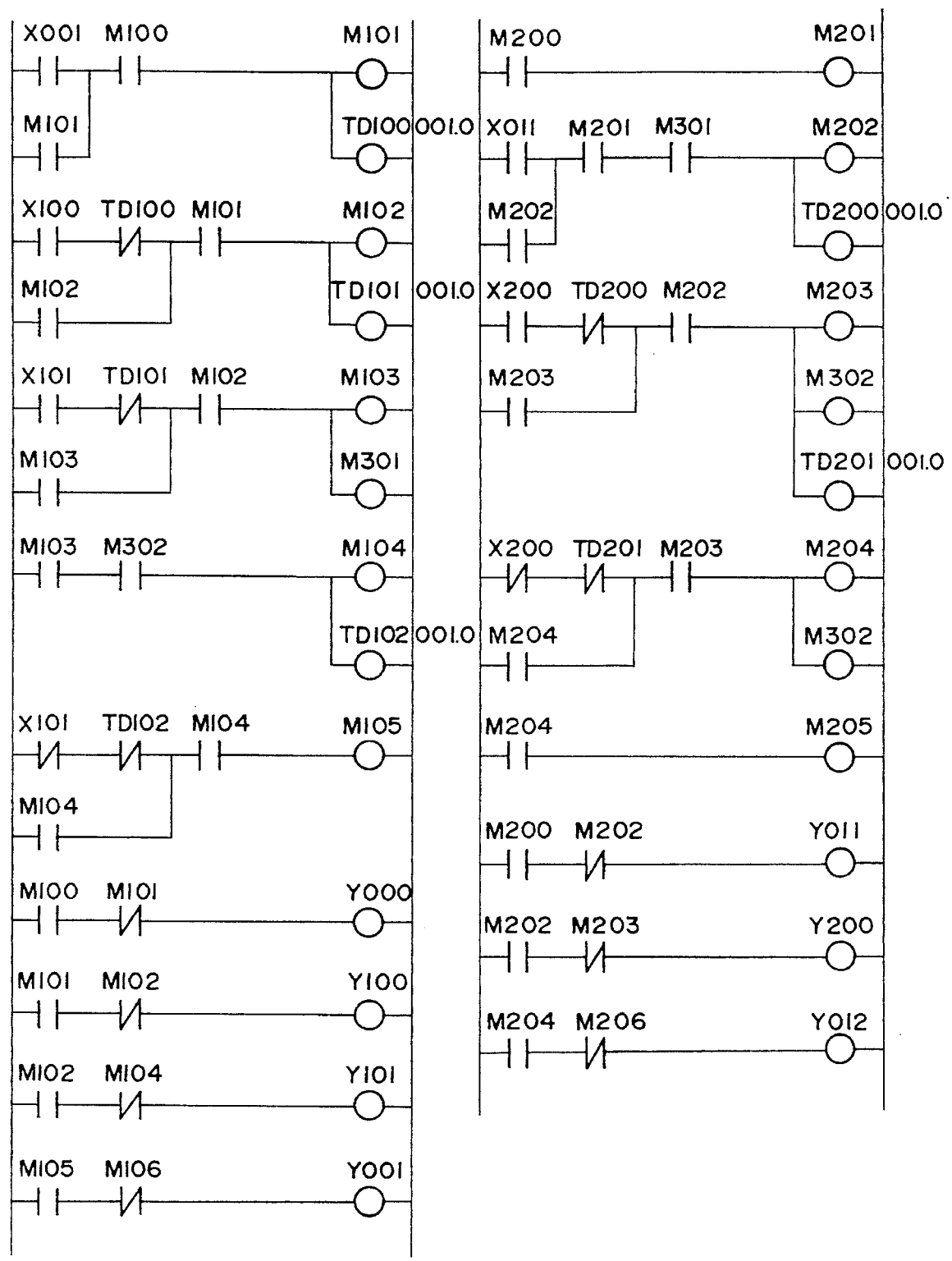
FIG. 25 is a diagram showing an example of a sequence control program using a ladder diagram converted from the cell control program of FIG. 10 so as to correspond to the control apparatus of FIG. 24 according to the present invention.

FIG. 25 shows the sequence control program 4 using a ladder diagram obtained by converting the cell control program 2 of FIG. 10 so as to correspond to the control apparatus of FIG. 24. FIGS. 26 and 27 show the robot control program 5.

Input contacts X001 and X011 of the ladder diagram of FIG. 25 correspond to output No. 1 (O1) of the controller 63 for robot No. 1 and output No. 1 (O1) of the controller 64 for robot No. 2, respectively.

As for output contacts of FIG. 25, Y000 and Y001 correspond to input No. 0 (I0) and No. 1 (I1) of the controller for robot No. 1, respectively. Y011 and Y012 correspond to input No. 0 (I0) and No. 1 (I1) of the controller for robot No. 2, respectively.

The robot control program 5 of FIG. 26 shows the program of ARM1. The robot control program 5 of FIG. 27 shows the program of ARM2. In case of ARM1, i.e., robot No. 1 59, for example, waiting state continues until the input No. 1 (I0), i.e., the output Y000 of the sequencer 62 turns on. If it turns on, processing proceeds to an operation instruction MOVP1(1) of the next step.

By thus automatically generating the program for synchronizing the sequencer 62 with the robot controllers 63 and 64, it becomes possible to cope with the control apparatus having a conventional configuration as shown in FIG. 24 and production of the cell control program 2 which is explicit in operation sequence is facilitated.

In the above described embodiments, the case in which a combination of a robot and other peripheral machines or devices forms the cell of the FA system has been described. In some cases, N.C. machine tools form the cell. In such a case, control can be performed in the same way. For example, processing for effecting working on predetermined parts using an N.C. machine tool may be described in the cell control program 2, and a part program for the N.C. machine tool may be generated by the cell control program conversion unit 3.

When the user constructs an FA system by combining a plurality of machines or devices including a robot, the above described embodiment of the present invention makes it possible to unify programs for controlling works of respective machines or devices as a cell control program and describe directly working specifications of the cell as a whole in the cell control program 2. It becomes unnecessary to produce separate programs using different programming languages for respective control devices as in the conventional technique. It also becomes unnecessary to learn several programming languages.

Furthermore, since the operation sequence of machines or devices in the FA system can be described structurally and explicitly, techniques of software engineering such as program addition, program modification, development with division of labor by using modules, and reuse of such modules can be applied.

Furthermore, since processing for synchronizing operation of a robot with operation of peripheral machines or devices can be described in such a form that the operator or user can intuitively understand at first sight, even a program for performing considerably complicated work can be described intelligibly. In addition, due to a synergistic effect, reduction of man-hours of program development and improvement of development efficiency can be achieved.

In turn, program productivity can be improved.

Furthermore, by using, as means for interpreting and executing the program thus produced, a method of advancing processing of internal codes on the basis of information of operation states of respective units included in the FA system, complicated work which is difficult to implement in the conventional method can be implemented.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A computer-implemented control method of factory automation system having a cell formed by a plurality of working machines including at least one automated machine to execute a series of works in accordance with a control program, said method comprising the steps of:

extracting, using a computer, information regarding a working sequence of said plurality of working machines and information regarding control of inputs and outputs of said plurality of working machines from a cell control program, which includes specifications of working of said cell as a whole, said cell control program being input to the computer, said cell control program further including information regarding a working sequence of said plurality of working machines, information regarding control of inputs and outputs of said plurality of working machines, information regarding operation control of said automated machine, and information regarding synchronization of operations of said working machines;

generating, on the basis of said extracted information by using the computer, a sequence control program in which control of the working sequence of said plurality of working machines and control of inputs and outputs of said plurality of working machines are described;

extracting, from said cell control program by using the computer, information regarding operation control of said automated machine and information regarding synchronization of operations of said working machines;

generating, on the basis of the information extracted in said extracting step using the computer, an automated machine control program in which processing for control over positioning and operation trajectory of said automated machine are described; and controlling working of said cell in accordance with said sequence control program and said automated machine control program.

2. A control method of factory automation system according to claim 1, wherein in said step of extracting information regarding the working sequence of said plurality of working machines, said information regarding the working sequence of said plurality of working machines comprises information regarding a relationship among operation states of a plurality of working machines and information regarding end conditions of said operation states;

in said step of generating the sequence control program, instruction of evaluation of operation state transition condition and execution of operation state transition in said sequence control program are generated on the basis of said extracted information regarding working sequence of said plurality of working machines, and input/output control instruction codes of said plurality of working machines are generated on the basis of said information regarding control of inputs and outputs of said plurality of working machines;

said information regarding synchronization of operations of said working machines extracted from the cell program comprises a state reference number representing operation timing of said automated machine; and said step of generating the automated machine control program comprises the steps of:

generating a state label instruction code of said automated machine control program on the basis of said state reference number, and generating automated machine control instruction codes of said automated machine control program on the basis of said information regarding operation control of said automated machine.

3. A control method of factory automation system according to claim 1, wherein said cell control program is described by using a graphic language using a diagrammatic notation of a Petri net for representation of operation state transition of said plurality of working machines.

4. A control method of factory automation system according to claim 1, wherein said method further comprises the step of generating said cell control program, and in said step of generating said cell control program, graphical user interface of multiwindow form is used, and in each window, operation sequences of said plurality of working machines, end conditions of respective states in the operation sequences, and operation contents in respective states are input and edited by cell control program editing means.

5. A control method of factory automation system according to claim 1, wherein said sequence control program and said automated machine control program, in which synchronizing processing between a sequence control processing system and an automated machine control processing system are described by using state label instruction code indicating such a state that operations of said working machines are currently being executed.

6. A computer-implemented control apparatus of factory automation system having a cell formed by a plurality of working machines including at least one automated machine to execute a series of works in accordance with a control program, comprising:

means for storing a cell control program input to the computer, said cell control program including specifications of working of said cell as a whole, said cell control program further including information regarding a working sequence of said plurality of working machines, information regarding control of inputs and outputs of said plurality of working machines, information regarding operation control of said automated machine, and information regarding synchronization operation of said working machines;

means for extracting information regarding a working sequence of said plurality of working machines and information regarding control of inputs and outputs of said plurality of working machines from said cell control program of said storing means;

means for generating, on the basis of the information extracted regarding the working sequence of said plurality of working machines and regarding control of inputs and outputs of said plurality of working machines, a sequence control program in which control of the working sequence of said plurality of working machines and control of inputs and outputs of said plurality of working machines are described;

means for extracting, from said cell control program, information regarding operation control of said automated machine and information regarding synchronization of operations of said working machines;

means for generating, on the basis of the information extracted regarding operation control of said automated machine and information regarding synchronization of operations of said working machines, an automated machine control program in which processing for control over positioning and operation trajectory of said automated machine are described; and means for controlling working of said cell in accordance with said sequence control program and said automated machine control program.

7. A control apparatus of factory automation system according to claim 6, wherein said cell control program is described by using a graphic language using a diagrammatic notation of a Petri net for representation of operation state transition of said plurality of working machines.

8. A control apparatus of factory automation system according to claim 7, comprising editing means for editing operation sequences of respective said working machines included in said cell control program, in diagrammatic notation of said Petri net.

9. A control apparatus of factory automation system according to claim 7, comprising editing means for editing operation sequences of respective ones of said working machines included in said cell control program by using instruction codes corresponding to diagrammatic notations of said Petri net in one-by-one correspondence.

10. A control apparatus of factory automation system according to claim 6, wherein said cell control program defines operation sequences of said plurality of working machines and transition rules of operation mode of said cell as a whole.

11. A control apparatus of factory automation system according to claim 6, wherein said cell control program is described by connecting, on the basis of information regarding synchronization of operations of said working machines, program modules of operation sequences respectively produced for said working machines.

12. A control apparatus of factory automation system according to claim 6, wherein said control apparatus further comprises:

cell control program editing means, said cell control program editing means including a data base for respectively, storing operation sequences of a plurality of working machines as ready-made program modules, means for loading ready-made program modules from said data base in accordance with specifications input regarding said plurality of working machines, and means for connecting said ready-made program modules on the basis of information regarding synchronization of operation of said working machines.

13. A control apparatus of factory automation system according to claim 6, wherein graphical user interface of multiwindow form produces said cell control program, said control apparatus further includes editing means, and in each window, operation sequences of respective said working machines, end conditions of respective states in the operation sequences, and operation contents in respective states are input and edited by said editing means.

14. A control apparatus of factory automation system according to claim 13, wherein said editing means internally represents said cell control program as instruction codes corresponding to all kinds of information input in said windows in one-by-one correspondence, and stores the instruction codes in one or more files.

15. A control apparatus of factory automation system according to claim 6, wherein said generating means for generating both said sequence control program and said automated machine control program generates said automated machine control program in the form of a surface language program which can be edited by the user, and converts said surface language program to an internal code program to be executed by said means for controlling working of said cell.

16. A control apparatus of factory automation system according to claim 6, wherein said means for generating a sequence control program and said means for generating an automated machine control program generate said sequence control program and said automated machine control program in the form of internal code programs to be executed by said means for controlling working of said cell.

17. A control apparatus of factory automation system according to claim 6, wherein said sequence control program is described by using a programming language based upon description of rule having an IF-THEN form as a surface language.

18. A control apparatus of factory automation system according to claim 6, wherein said sequence control program and said automated machine control program in which synchronizing processing between a sequence control processing system and an automated machine control processing system is described by using state label instruction codes indicating such a state that operations of said working machines are currently being executed.

19. A control apparatus of factory automation system according to claim 6, wherein said cell working control means jumps directly to an address of a state label instruction code described in said sequence control program and selectively monitors only I/O signals and internal variables to be monitored in the state which is currently being executed in order to reduce the time required for execution processing of said sequence control program.

20. A control apparatus of factory automation system according to claim 6, wherein said cell working control means respectively comprise a sequencer and an automated machine controller mutually connected with I/O, and said generating means generates a program of ladder diagram for the sequencer and a program of a robot language for the automated machine controller.

21. A control apparatus of factory automation system according to claim 6, wherein said cell working control means comprises a controller having a sequence control processor, an automated machine control processor, and a shared memory connected to said both processors via bus lines, wherein said shared memory stores common information about operation states of said working machines used between said sequence control program and said automated machine control program.

* * * * *